(12) United States Patent
Taguchi et al.

(10) Patent No.: US 7,083,664 B2
(45) Date of Patent: *Aug. 1, 2006

(54) INKJET COLOR INK

(75) Inventors: Toshiki Taguchi, Shizuoka (JP); Naotaka Wachi, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 182 days.

This patent is subject to a terminal disclaimer.

(21) Appl. No.: 10/714,845

(22) Filed: Nov. 18, 2003

(65) Prior Publication Data

US 2004/0094064 A1    May 20, 2004

(30) Foreign Application Priority Data

Nov. 18, 2002  (JP) .......................... P.2002-333603
Nov. 17, 2003  (JP) .......................... P.2003-386207

(51) Int. Cl.
*C09D 11/02*  (2006.01)

(52) U.S. Cl. .............................. 106/31.27; 106/31.48; 106/31.5; 106/31.51; 106/31.52

(58) Field of Classification Search ............. 106/31.27, 106/31.48, 31.5, 31.51, 31.52
See application file for complete search history.

(56) References Cited

U.S. PATENT DOCUMENTS

| 2002/0107301 | A1 | 8/2002 | Yamanouchi et al. | |
|---|---|---|---|---|
| 2002/0143079 | A1 | 10/2002 | Yamanouchi et al. | |
| 2004/0053988 | A1* | 3/2004 | Taguchi et al. | 514/419 |
| 2004/0066438 | A1* | 4/2004 | Taguchi et al. | 347/100 |
| 2004/0070654 | A1* | 4/2004 | Taguchi et al. | 347/100 |
| 2004/0080596 | A1* | 4/2004 | Taguchi et al. | 347/100 |
| 2004/0154496 | A1* | 8/2004 | Taguchi | 106/31.48 |

FOREIGN PATENT DOCUMENTS

| EP | 0340723 A2 | 11/1989 |
|---|---|---|
| EP | 1340796 A1 | 9/2003 |
| EP | 1350820 A1 | 10/2003 |
| EP | 1352754 A2 | 10/2003 |
| JP | 2002-60664 A | 2/2002 |
| JP | 2002-105358 A | 4/2002 |
| JP | 2002-105366 A | 4/2002 |
| JP | 2002-105367 A | 4/2002 |
| JP | 2002-138224 A | 5/2002 |

OTHER PUBLICATIONS

Abstract of Japan, XP002270246 & JP 2001 115072 A (Fuji Xerox Co LTD). Apr. 24, 2001.
U.S. Appl. No. 10/671,729, filed Sep. 29, 2003, Toshiki Taguchi and Toshiaki Ono.
U.S. Appl. No. 10/671,736, filed Sep. 29, 2003, Toshiki Taguchi and Naotaka Wachi.

* cited by examiner

*Primary Examiner*—Helene Klemanski
(74) *Attorney, Agent, or Firm*—Sughrue Mion, PLLC

(57) ABSTRACT

An inkjet color ink comprising: an aqueous medium; at least one yellow dye having a λmax of from 390 nm to 470 nm and an [I(λmax+70 nm)/I(λmax)] ratio of an absorbance I(λmax+70 nm) at λmax+70 nm to an absorbance I(λmax) at λmax of not more than 0.4; and at least one dye having a λmax of longer than 470 nm and not longer than 750 nm, the at least one yellow dye and the at least one dye being at least dissolved or dispersed in the aqueous medium, wherein both of the rate constants defined herein are not more than $5.0 \times 10^{-2}$ hour$^{-1}$.

19 Claims, No Drawings

INKJET COLOR INK

FIELD OF THE INVENTION

The present invention an inkjet recording ink having excellent image preservability.

BACKGROUND OF THE INVENTION

In recent years, following the spread of counters, inkjet printers are widely utilized for printing on paper, films, cloths, etc. in not only offices but also households.

The inkjet recording method includes a mode of applying a pressure by a piezoelectric element to discharge droplets; a mode of generating bubbles in an ink by heat to discharge droplets; a mode of using ultrasonic wave; and a mode of sucking and discharging droplets by electrostatic force. As ink compositions for such inkjet recording, aqueous inks, oil based inks, or solid (melt type) inks are used. Of these inks, aqueous inks are the main current from the standpoints of manufacture, handling, smell, safety, etc.

With respect to coloring agents that are used in these inkjet recording inks, there are requirements that they have high solubility in solvent; that they can undergo high-density recording; that they have good hu; that they have excellent fastness to light, heat, air, water, and chemicals; that they have good fixation to an image receiving material and hardly cause bleeding; that they have excellent preservability as an ink; that they have no toxicity; that they have high purity; and that they can be cheaply obtained. However, it is extremely difficult to seek coloring agents that can meet these requirements at high levels. Though various inkjet dyes and pigments have already been proposed and actually used, it is the present state that coloring agents that can meet all of the requirements have not yet been discovered. According to the conventionally well known dyes and pigments to which color index (C.I.) numbers are assigned, it is difficult to reconcile hue and fastness required for inkjet recording inks. Also, recently, technological development on inkjet printers targeting photographic image quality is eagerly carried out. For the sake of satisfactorily printing portraits, there have been developed kinds of machines mounted with a dark yellow ink comprising a yellow ink mixed with a pigment having absorption in a cyan or magenta region, in addition to conventional ones mounted with a yellow ink (for example, a PM-950C printer of Seiko Epson Corporation).

The present inventors proceeded with development of inkjet inks using dyes. However, it has been noted that there is a problem such that a dark yellow ink having excellent durability to ozone is hardly obtained.

As background arts, there are JP-A-2002-060664, JP-A-2002-105366, JP-A-2002-105367, JP-A-2002-105358, JP-A-2002-138224 and the like.

SUMMARY OF THE INVENTION

A problem that the invention is to solve is to provide an inkjet dark yellow ink capable of giving an image that is excellent in image preservability even when exposed to high-concentration ozone.

The problem of the invention has been attained by the dark yellow inkjet ink set forth in the following items (1) to (5).

(1) An inkjet color ink comprising at least one yellow dye having a λmax (maximum absorption wavelength) of from 390 nm to 470 nm and an [I(λmax+70 nm)/I(λmax)] ratio of an absorbance I(λmax+70 nm) at λmax+70 nm to an absorbance I(λmax) at λmax of not more than 0.4 and at least one dye having a λmax of longer than 470 nm and not longer than 750 nm dissolved and/or dispersed in an aqueous medium, wherein when the ink is printed on a reflection medium so as to form a stepwise pattern, whose reflection spectrum is measured by a spectrophotometer, a point giving a reflection spectrum such that a λmax density ($D_B$) at an maximum absorption wavelength in a yellow region (390 nm to 470 nm) becomes from 0.90 to 1.10 is selected, the other λmax density at an maximum absorption wavelength in a region of longer than 470 nm and not longer than 750 nm is defined as $D_X$, the printed material is discolored by force using an ozone discoloration tester capable of always generating 5 ppm of ozone, and a forced discoloration rate constant determined from a time then each of the reflection densities $D_B$ and $D_X$ becomes 80% of the initial density is defined, any of the rate constants are not more than $5.0 \times 10^{-2}$ [hour$^{-1}$].

(2) The inkjet color ink set forth in the item (1), wherein the yellow dye has a λmax of from 390 nm to 470 nm and an [I(λmax+70 nm)/I(λmax)] ratio of an absorbance I(λmax+70 nm) at λmax+70 nm to an absorbance I(λmax) at λmax of not more than 0.2.

(3) The inkjet color ink set forth in the item (1) or (2) wherein any of the yellow dye and the dye having a λmax of longer than 470 nm and not longer than 750 nm have an oxidation potential nobler than 1.0 V (vs SCE).

(4) The inkjet color ink set forth in any one of the items (1) to (3), wherein the yellow dye is a compound represented by the following formula (1).

Formula (1)

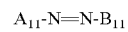

In the formula, $A_{11}$ and $B_{11}$ each independently represents an optionally substituted heterocyclic group.

(5) The inkjet color ink set forth in any one of the item (1) to (4), wherein at least one dye having a λmax of longer than 470 nm and not longer than 750 nm is a compound represented by the following formula (2).

Formula (2)

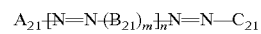

In the formula, $A_{21}$, $B_{21}$, and $C_{21}$ each independently represents an optionally substituted aromatic group or heterocyclic group; and m and n each represents an integer of 0 or more.

DETAILED DESCRIPTION OF THE INVENTION

The invention will he hereunder described in detail.

First of all, as the dye that is used in the invention, dyes having an oxidation potential nobler than 1.0 V (vs SCE) are preferable, dyes having an oxidation potential nobler than 1.1 V (vs SCE) are more preferable, and dyes having an oxidation potential nobler than 1.2 V (vs SCE) are especially preferable from the standpoints of fastness and fastness to ozone gas. With respect to the kind of dye, azo dyes that meet the foregoing requirements of physical properties are especially preferable.

The oxidation potential value (Eox) can be easily measured by those skilled in the art. This method is described in, for example, Delahay, New Instrumental Methods in Electrochemistry, published by Interscience Publishers (1954), A. J. Bard, et al., Electrochemical Methods, published by John Willey & Sons (1980), and Akira Fujishima, et al., Denkikagaku Sokutei-ho (Electrochemical Measurement Methods), published by Gihodo Suppan (1984).

Concretely, the oxidation potential is measured by dissolving from $1\times10^{-4}$ to $1\times10^{-6}$ moles/L of a test sample in a solvent (such as dimethylformamide and acetonitrile) containing a supporting electrolyte (such as sodium perchlorate and tetrapropylammonium perchlorate) and obtaining a value against SCE (saturated calomel electrode) using cyclic voltammetry or direct current polarography. Though this value may possibly be displaced by approximately several tens millivolts due to influences by liquid junction potential, liquid resistance of a sample solution, etc., it is possible to guarantee reproducibility of the potential by charging a standard sample (such as hydroquinone).

Incidentally, for the sake of univocally defining the potential, in the invention, a value (vs SCE) measured in dimethylformamide (dye concentration: 0.001 moles/dm$^3$) containing 0.1 moles/dm$^3$ of tetrapropylammonium perchlorate as a supporting electrolyte using direct current polarography is defined as an oxidation potential of the dye.

The Eox value represents easiness of movement of an electron from the sample to the electrode. When this value is large (the oxidation potential is noble), the electron hardly moves from the sample to the electrode, in another word, the sample in hardly oxidized. In relationship with the compound structure, when an electron withdrawing group is introduced, the oxidation potential becomes nobler, whereas when an electron providing group is introduced, the oxidation potential becomes baser. In the invention, for the sake of decreasing reactivity with ozone as an electrophilic agent, it is desired to introduce an electron withdrawing group into the yellow dye skeleton to make the oxidation potential nobler.

Also, it is preferable that the yellow dye that is used in the invention has good fastness and good hue, and especially, it is preferable that in the absorption spectrum, a tail in the long wavelength side is sharp. For achieving this, the yellow dye preferably has a λmax of from 390 nm to 470 nm and an [I(λmax+70 nm)/I(λmax)] ratio of an absorbance I(λmax+70 nm) at λmax+70 nm to an absorbance I(λmax) at λmax of not more than 0.2, more preferably not more than 0.12, and still more preferably not more than 0.1.

As the dye that meets such oxidation potential and absorption characteristics, ones represented by the following formula (1) are preferable.

Formula (1)

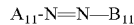

In the formula, $A_{11}$ and $B_{11}$ each independently represents an optionally substituted heterocyclic group. As the heterocyclic ring, heterocyclic rings constituted of a 5-membered ring or a 6-membered ring are preferable. The heterocyclic ring may be of a monocyclic structure or a polycyclic structure in which two or more rings are fused, and may be an aromatic heterocyclic ring or a non-aromatic heterocyclic ring. As the hetero atom constituting the heterocyclic ring, N, O and S atoms are preferable.

In the foregoing formula (1), as the heterocyclic ring represented by $A_{11}$, 5-pyrazolone, pyrazole, triazole, oxazolone, isoxazolone, barbituric acid, pyridone, pyridine, rhodanine, pyrazolinedione, pyrazolopyridone, Meldrum's acid, and fused heterocyclic rings in which a hydrocarbon aromatic ring or a heterocyclic ring is further fused with such a heterocyclic ring. Above all, 5-pyrazolone, 5-aminopyrazole, pyridone, 2,6-diaminopyridine, and pyrazoloazoles are preferable; and 5-aminopyrazole, 2-hydroxy-pyridone, and pyrazolotriazole are especially preferable.

Examples of the heterocyclic ring represented by $B_{11}$ include pyridine, pyrazine, pyrimidine, pyridazine, triazine, quinoline, isoquinoline, guinazoline, cinnoline, phthalazine, quinoxaline, pyrrole, indole, furan, benzofuran, thiophene, benzothiophene, pyrazole, imidazole, benzoxiadazole, triazole, oxazole, isoxazole, benzoxazole, thiazole, benzothiazole, isothiazole, benzoisothiazole, thiadiazole, benzoisoxazole, pyrrolidine, piperidine, piperazine, imidazoline, and thiazoline. Above all, pyridine, quinoline, thiophene, benzothiophene, pyrazole, imidazole, benzoimidazole, triazole, oxazole, isoxazole, benzoxazole, thiazole, benzothiazole, isothiazole, benzoisothiazole, thiadiazole, and benzoisoxazole are preferable; quinoline, thiophene, pyrazole, thiazole, benzoxazole, benzoisoxazole, isothiazole, imidazole, benzothiazole, and thiadiazole are more preferable; and pyrazole, benzothiazole, benzoxazole, imidazole, 1,2,4-thiadiazole, and 1,3,4-thiadiazole are especially preferable.

Examples of substituents that can be substituted on $A_{11}$ and $B_{12}$ include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an imido group, a phosphino group, a phosphinyl group, a phosphinyloxy group, a phosphinylamino group, and a silyl group.

In the case where the dye of the formula (1) is used as a water-soluble dye, it is preferable that the dye has at least one ionically hydrophilic group in the molecule. Examples of the ionically hydrophilic group include a sulfo group, a carboxyl group, a phosphono group, and a quaternary ammonium group. As the ionically hydrophilic group, a carboxyl group, a phosphono group, and a sulfo group are preferable; and a carboxyl group and a sulfo group are especially preferable. The carboxyl group, the phosphono group, and the sulfo group may be in the state of a salt. Examples of counter ions for forming a salt include an ammonium ion, an alkali metal ion (such as a lithium ion, a sodium ion, and a potassium ion), and an organic cation (such as a tetramethylammonium ion, a tetramethylguanidium ion, and a tetraxmethylphosphonium ion). Of these counter ions, alkali metal salts are preferable.

Of the dyes represented by the formula (1), dyes of the formulae (12), (13) and (14) are preferable.

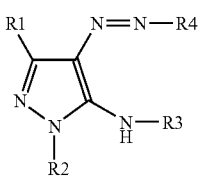

Formula (12)

In the formula (12), R1 and R3 each represents a hydrogen atom, a cyano group, an alkyl group, a cycloalkyl group, an aralkyl group, an alkoxy group, an alkylthio group, an arylthio group, an aryl group, or an ionically hydrophilic group: R2 represents a hydrogen atom, an alkyl group, a cycloalkyl group, an aralkyl group, a carbamoyl group, an acyl group, an aryl group, or a heterocyclic group; and R4 represents a heterocyclic group.

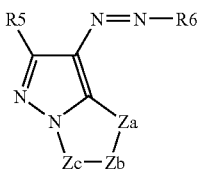

Formula (13)

In the formula (13), R5 represents a hydrogen atom, a cyano group, an alkyl group, a cycloalkyl group, an aralkyl group, an alkoxy group, an alkylthio group, an arylthio group, an aryl group, or an ionically hydrophilic group; Za represents —N=, —NH—, or —C(R11)=; Zb and Zc each independently represents —N= or —C(R11)=; R11 represents a hydrogen atom or a non-metallic substituent; and R6 represents a heterocyclic group.

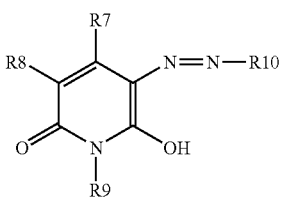

Formula (14)

In the formula (14), R7 and R9 each independently represents a hydrogen atom, a cyano group, an alkyl group, a cycloalkyl group, an aralkyl group, an aryl group, an alkylthio group, an arylthio group, an alkoxycarbonyl group, a carbamoyl group, or an ionically hydrophilic group; R8 represents a hydrogen atom, a halogen atom, an alkyl group, an alkoxy group, an aryl group, an aryloxy group, a cyano group, an acylamino group, a sulfonylamino group, an alkoxycarbonylamino group, a ureido group, an alkylthio group, an arylthio group, an alkoxycarbonyl group, a carbamoyl group, a sulfamoyl group, a sulfonyl group, an acyl group, an alkylamino group, an arylamino group, a hydroxyl group, or an ionically hydrophilic group; and R10 represents a heterocyclic group.

In the foregoing formulae (12), (13) and (14), the alkyl group represented by R1, R2, R3, R5, R7, R8, and R9 includes a substituted alkyl group and an unsubstituted alkyl group. As the alkyl group, alkyl groups having from 1 to 20 carbon atoms are preferable. Examples of substituents include a hydroxyl group, an alkoxy group, a cyano group, a halogen atom, and an ionically hydrophilic group. Examples of the alkyl group include methyl, ethyl, butyl, isopropyl, t-butyl, hydroxyethyl, methoxyethyl, cyanoethyl, trifluoromethyl, 3-sulfopropyl, and 4-sulfobutyl.

The cycloalkyl group represented by R1, R2, R3, R5, R7, R8, and R9 includes a substituted cycloalkyl group and an unsubstituted cycloalkyl group. As the cycloalkyl group, cycloalkyl groups having from 5 to 12 carbon atoms are preferable. Examples of substituents include an ionically hydrophilic group. Examples of the cycloalkyl group include cyclohexyl. The aralkyl group represented by R1, R2, R3, R5, R7, R8, and R9 includes a substituted aralkyl group and an unsubstituted aralkyl group. As the aralkyl group, aralkyl groups having from 7 to 20 carbon atoms are preferable. Examples of substituents include an ionically hydrophilic group. Examples of the aralkyl group include benzyl and 2-phenethyl.

The aryl group represented by R1, R2, R3, R5, R7, and R9 includes a substituted aryl group and an unsubstituted aryl group. As the aryl group, aryl groups having from 6 to 20 carbon atoms are preferable. Examples of substituents include an alkyl group, an alkoxy group, a halogen atom, an alkylamino group, and an ionically hydrophilic group. Examples of the aryl group include phenyl, p-tolyl, p-methoxyphenyl, o-chlorophenyl, and m-(3-sulfopropylamino) phenyl.

The alkylthio group represented by R1, R2, R3, R5, R7, R8, and R9 includes a substituted alkylthio group and an unsubstituted alkylthio group. As the alkylthio group, alkylthio groups having from 1 to 20 carbon atoms are preferable. Examples of substituents include an ionically hydrophilic group. Examples of the alkylthio group include methylthio and ethylthio. The arylthio group represented by R1, R2, R3, R5, R7, R8, and R9 includes a substituted arylthio group and an unsubstituted arylthio group. As the arylthio group, arylthio groups having from 6 to 20 carbon atoms are preferable. Examples of substituents include an alkyl group and an ionically hydrophilic group. Examples of the arylthio group include phenylthio and p-tolylthio.

The heterocyclic group represented by R2 is preferably a 5-membered or 6-membered heterocyclic group, which may further be fused. As the hetero atom constituting the heterocyclic ring, N, S, and O are preferable. Also, the heterocyclic ring may be an aromatic heterocyclic ring or a non-aromatic heterocyclic ring. The heterocyclic ring may further be substituted. Examples of substituents include the same substituents as those of the aryl group described later. Preferable examples of the heterocyclic ring include a 6-membered nitrogen-containing aromatic heterocyclic ring; and especially preferable examples include triazine, pyrimidine, and phthalazine.

Examples of the halogen atom represented by R8 include a fluorine atom, a chlorine atom, and a bromine atom. The alkoxy group represented by R1, R3, R5, and R8 includes a substituted alkoxy group and an unsubstituted alkoxy group. As the alkoxy group, alkoxy groups having from 1 to 20 carbon atoms are preferable. Examples of substituents include a hydroxyl group and an ionically hydrophilic group. Examples of the alkoxy group include methoxy, ethoxy, isopropoxy, methoxyethoxy, hydroxyethoxy, and 3-carboxypropoxy.

The aryloxy group represented by R8 includes a substituted aryloxy group and an unsubstituted aryloxy group. As the aryloxy group, aryloxy groups having from 6 to 20 carbon atoms are preferable. Examples of substituents include an alkoxy group and an ionically hydrophilic group.

Examples of the aryloxy group include phenoxy, p-methoxyphenoxy, and o-methoxyphenoxy. The acylamino group represented by R8 includes a substituted acylamino group and an unsubstituted acylamino group. As the acylamino group, acylamino groups having from 2 to 20 carbon atoms are preferable. Examples of substituents include an ionically hydrophilic group. Examples of the acylamino group acetamide, propionamide, benzamide, and 3,5-disulfobenzamide.

The sulfonylamino group represented by R8 includes a substituted sulfonylamino group and an unsubstituted sulfonylamino group. As the sulfonylamino group, sulfonylamino groups having from 1 to 20 carbon atoms are preferable. Examples of the sulfonylamino group include methylsulfonylamino and ethylsulfonylamino. The alkoxycarbonylamino group represented by R8 includes a substituted alkoxycarbonylamino group and an unsubstituted alkoxycarbonylamino group. As the alkoxycarbonylamino group, alkoxycarbonylamino groups having from 2 to 20 carbon atoms are preferable. Examples of substituents include an ionically hydrophilic group. Examples of the alkoxycarbonylamino group include ethoxycarbonylamino.

The ureido group represented by R8 includes a substituted ureido group and an unsubstituted ureido group. As the ureido group, ureido groups having from 1 to 20 carbon atoms are preferable. Examples of substituents include an alkyl group and an aryl group. Examples of the ureido group include 3-methylureido, 3,3-dimethylureido, and 3-phenylureido.

The alkoxycarbonyl group represented by R7, R8, and R9 includes a substituted alkoxycarbonyl group and an unsubstituted alkoxycarbonyl group. As the alkoxycarbonyl group, alkoxycarbonyl groups having from 2 to 20 carbon atoms are preferable. Examples of substituents include an ionically hydrophilic group. Examples of the alkoxycarbonyl group include methoxycarbonyl and ethoxycarbonyl.

The carbamoyl group represented by R2, R7, R8, and R9 includes a substituted carbamoyl group and an unsubstituted carbamoyl group. Examples of substituents include an alkyl group. Examples of the carbamoyl group include a methylcarbamoyl group and a dimethylcarbamoyl group. The sulfamoyl group represented by R8 includes a substituted sulfamoyl group and an unsubstituted sulfamoyl group. Examples of substituents include an alkyl group. Examples of the sulfamoyl group include a dimethylsulfamoyl group and a di-(2-hydroxyethyl)sulfamoyl group.

Examples of the sulfonyl group represented by R8 include methanesulfonyl and phenylsulfonyl. The acyl group represented by R2 and R8 includes a substituted acyl group and an unsubstituted acyl group. As the acyl group, acyl groups having from 1 to 20 carbon atoms are preferable. Examples of substituents include an ionically hydrophilic group. Examples of the acyl group include acetyl and benzoyl.

The amino group represented by R8 includes a substituted amino group and an unsubstituted amino group. Examples of substituents include an alkyl group, an aryl group, and a heterocyclic group. Examples of the amino group include methylamino, diethylamino, anilino, and 2-chloroanilino.

The heterocyclic group represented by R4, R6, and R10 is the same as the optionally substituted heterocyclic group represented by $B_{11}$ of the formula (1); and preferred examples, more preferred examples, and especially preferred examples thereof are also the same as those described previously. Examples of substituents include an ionically hydrophilic group, an alkyl group having from 1 to 12 carbon atoms, aryl group, an alkylthio group, an arylthio group, a halogen atom, a cyano group, a sulfamoyl group, a sulfonamino group, a carbamoyl group, and an acylamino group. The alkyl group and the aryl group may further be substituted.

In the foregoing formula (13), Za represents —N═, —NH—, or —C(R11)═; Zb and Zc each independently represents —N═ or —C(R11)═; and R11 represents a hydrogen atom or a non-metallic substituent. As the non-metallic substituent represented by R11, a cyano group, a cycloalkyl group, an aralkyl group, an aryl group, an alkylthio group, an arylthio group, and an ionically hydrophilic group are preferable. Each of the foregoing substituents is synonymous with each of the substituents represented by R1, and preferred examples thereof are also the same. Examples of the skeleton of a heterocyclic ring constituted of the two 5-membered rings included in the foregoing formula (13) are given below.

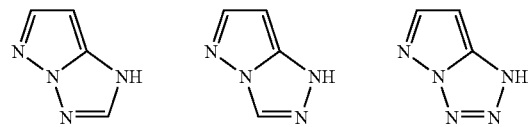

In the case where each of the substituents described previously may further be substituted, examples of substituents include substituents that may be substituted on the heterocyclic rings $A_{11}$ and $B_{11}$ of the foregoing formula (1).

In the case where the dye represented by the formula (12), (13) or (14) is used as the water-soluble dye, it is preferable that the dye has at least one ionically hydrophilic group in the molecule. Examples include dyes represented by the formulae (12) to (14) wherein R1, R2, R3, R5, R7, R8, and R9 each represents an ionically hydrophilic group and dyes represented by the formulae (12) to (14) wherein each of R1 to R11 further has an ionically hydrophilic group as a substituent. Examples of the ionically hydrophilic group include a sulfo group, a carboxyl group, a phosphono group, and a quaternary ammonium group. As the ionically hydrophilic group, a carboxyl group, a phosphono group, and a sulfo group are preferable; and a carboxyl group and a sulfo group are especially preferable. The carboxyl group, the phosphono group, and the sulfo group may be in the state of a salt. Examples of counter ions for forming a salt include an ammonium ion, an alkali metal ion (such as a lithium ion, a sodium ion, and a potassium ion), and an organic cation (such as a tetramethylammonium ion, a tetramethylguanidium ion, and a tetramethylphosphonium ion). Of these counter ions, alkali metal salts are preferable.

Of the foregoing formulae (12), (13) and (14), the formula (12) is preferable; and dyes represented by the following formula (12-1) are especially preferable.

Formula (12-1)

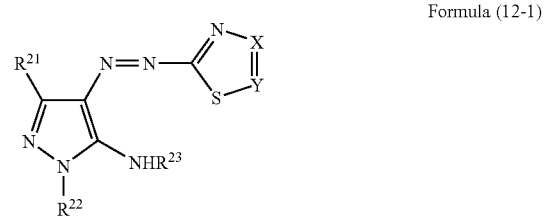

In the formula (12-1), $R^{21}$ and $R^{23}$ each represents a hydrogen atom, an alkyl group, a cycloalkyl group, an aralkyl group, an alkoxy group, or an aryl group. $R^{22}$ represents an aryl group or a heterocyclic group. One of X and Y represents a nitrogen atom, and the other represents —$CR^{24}$. $R^{24}$ represents a hydrogen atom, a halogen atom, a cyano group, an alkyl group, an alkylthio group, an alkylsulfonyl group, an alkylsulfinyl group, an alkyloxycarbonyl group, a carbamoyl group, an alkoxy group, an aryl group, an arylthio group, an arylsulfonyl group, an arylsulfinyl group, an aryloxy group, or an acylamino group. These respective groups may further be substituted.

As described above, the yellow dye of the invention has a characteristic that A and B in the molecule are both heterocyclic groups; with such a structure, the broadening of the absorption spectrum is prevented, a favorable color hue as well as a sharp absorption as a dye is achieved, and further is imparted with a high ozone resistance due to the elimination of dissociable proton that is vulnerable to oxidation and multi-bonding positions together with the shift of oxidation potential to noble direction with the introduction of an electron withdrawing group into the entire molecular structure.

Specific examples of preferable dyes that are used in the invention will be given below, but it should not be construed that the dye to be used in the invention is limited to these specific examples. These compounds can be synthesized by referring to JP-A-2-24191, JP-A-2001-279145, and Japanese Patent Application No. 2002-124832.

YI-1

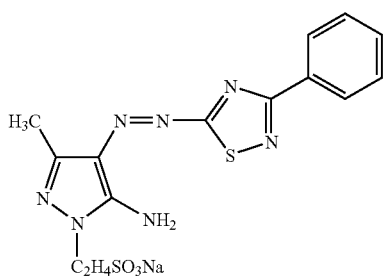

YI-2

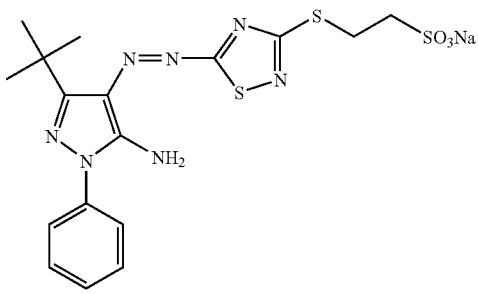

YI-3

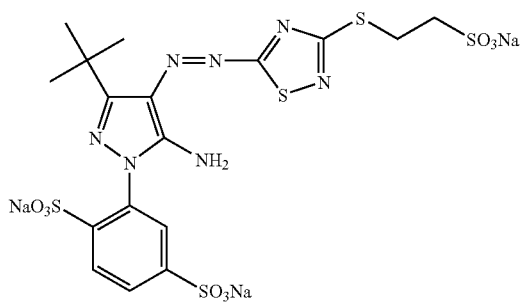

YI-4

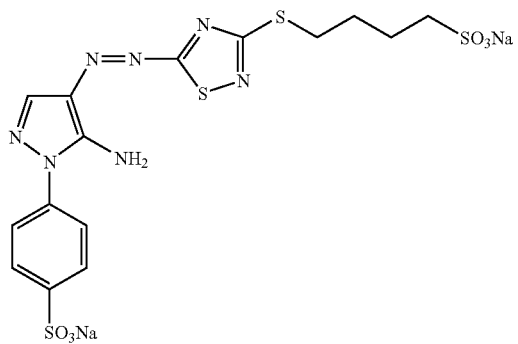

-continued
YI-5
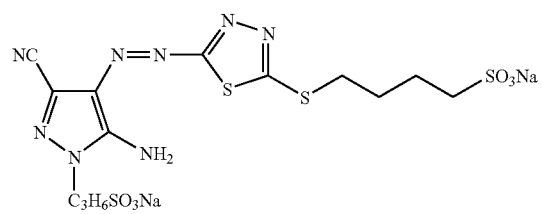
YI-6
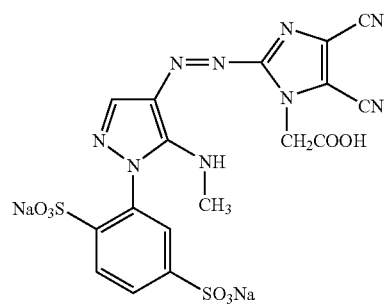
YI-7
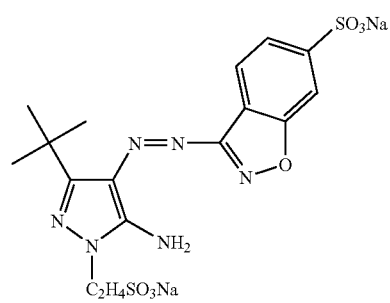
YI-8
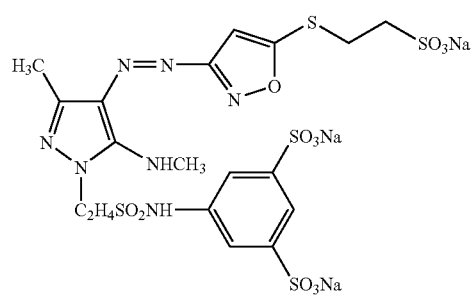
YI-9
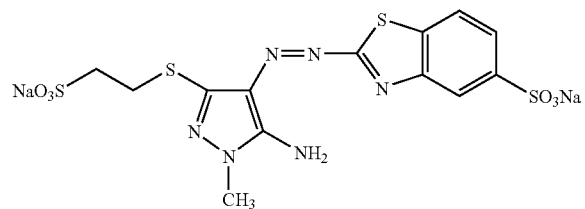

-continued
YI-10
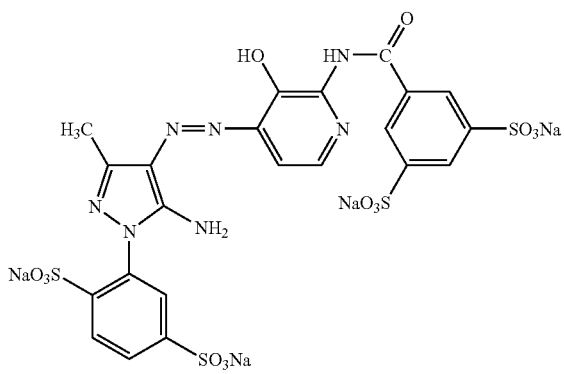
YI-11
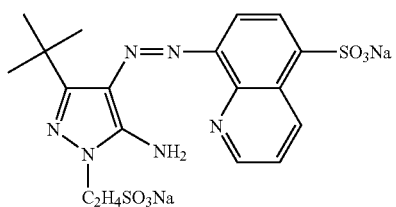
YI-12
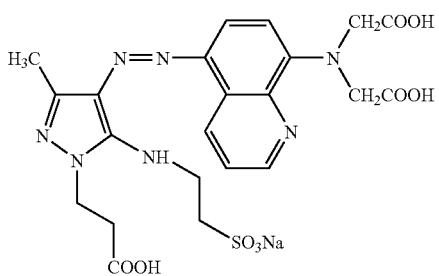
YI-13
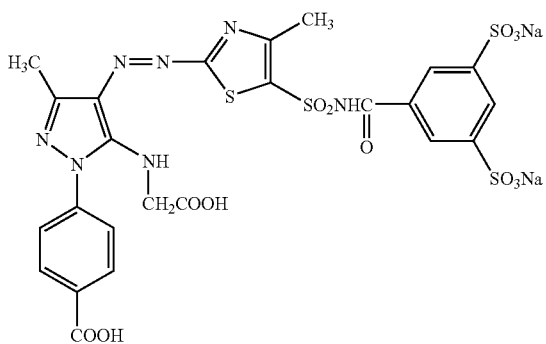
YI-14
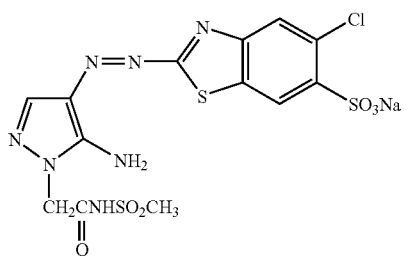

-continued
YI-15
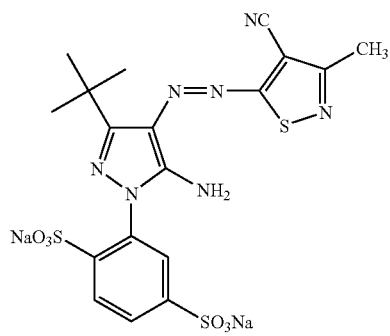
YI-16
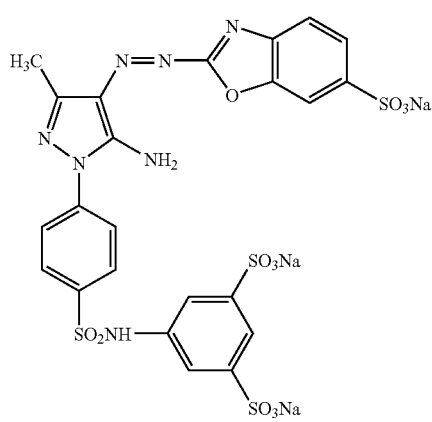
YI-17
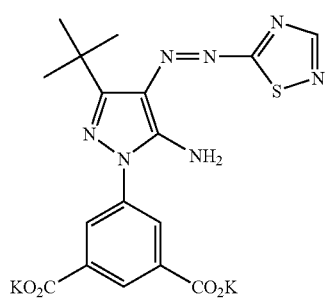
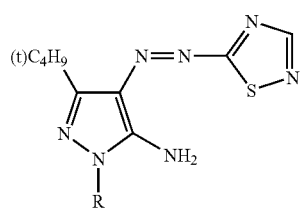
| Pigment | R |
|---|---|
| YI-18 | $CH_3$ |
| YI-19 | $C_3H_6SO_3Na$ |
| YI-20 | H |
| YI-21 | $C_2H_4CN$ |
YI-22
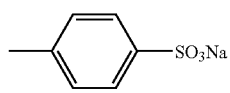

-continued
| | | |
|---|---|---|
| YI-23 | 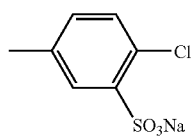 | |
| YI-24 | 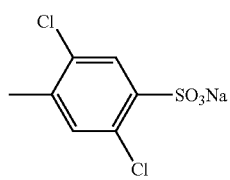 | |
| YI-25 | 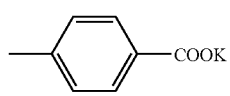 | |
| YI-26 | 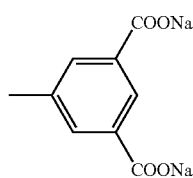 | |
| YI-27 | 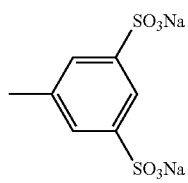 | |
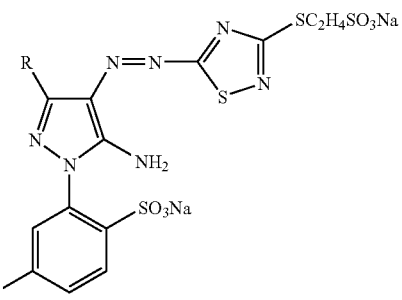
| Pigment | R |
|---|---|
| YI-28 | $CH_3$ |
| YI-29 | 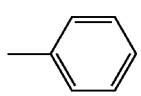 |
| YI-30 | $OC_2H_5$ |

-continued
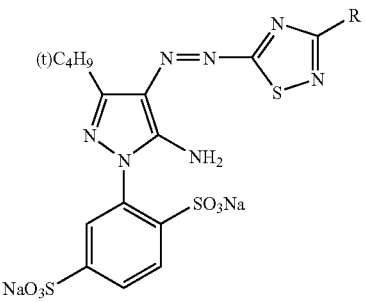
| Pigment | R |
|---|---|
| YI-31 | 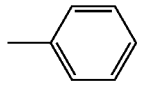 |
| YI-32 | CH₃ |
| YI-33 | SC₂H₄SO₃Na |
| YI-34 | SO₂C₂H₄SO₃Na |
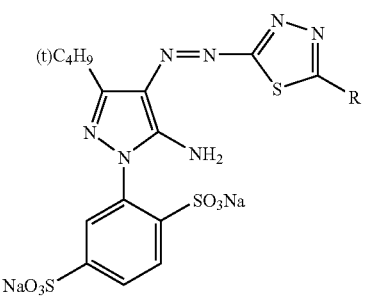
| Pigment | R |
|---|---|
| YI-35 | H |
| YI-36 | CH₃ |
| YI-37 | 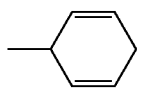 |
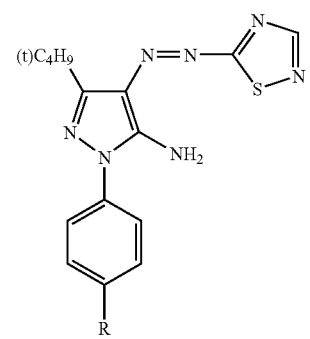
| Pigment | R |
|---|---|
| YI-38 | COOC₄H₉ |
| YI-39 | CON(C₄H₉)₂ |
| YI-40 | SO₂NHC₁₂H₂₅ |
| YI-41 | OC₈H₁₇ |

-continued
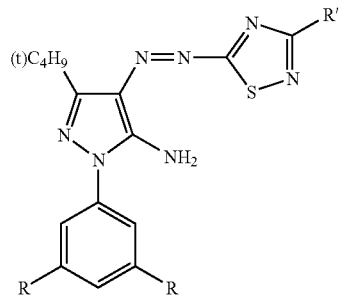
| Pigment | R | R' |
|---|---|---|
| YI-42 | CON(C₄H₉)₂ | H |
| YI-43 | COOC₈H₁₇ | H |
| YI-44 | CON(C₄H₉)₂ | 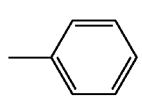 |
| YI-45 | CON(C₄H₉)₂ | CH₃ |
| YI-46 | H | 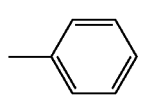 |
| YI-47 | H | SC₈H₁₇ |
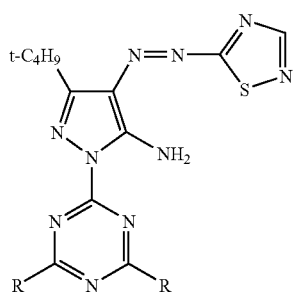
| Pigment | R |
|---|---|
| YI-48 | —NHC₂H₄COOK |
| YI-49 | —NHC₂H₄SO₃Na |
| YI-50 | 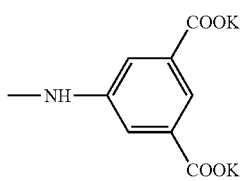 |
| YI-51 | 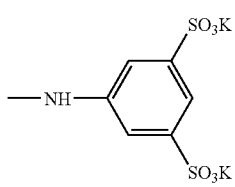 |

-continued

| | |
|---|---|
| YI-52 | [structure: -NH-phenyl with KO₃S and SO₃K substituents] |
| YI-53 | —N(CH₂COONa)₂ |
| YI-54 | [structure: -NH-phenyl with KOOC and COOK substituents] |
| YI-55 | —NH—[phenyl]—SO₃Na |
| YI-56 | —NHC₆H₁₃ |
| YI-57 | —N(C₄H₉)₂ |

[structure: central triazine connected via two NH groups to 3,5-dicarboxylate (NaOOC) phenyl rings, and to a pyrazole bearing t-C₄H₉, NH₂, and N=N—Ar azo group]

| Pigment | Ar |
|---|---|
| YI-58 | [5-methyl-1,3,4-thiadiazole with SCH₃] |
| YI-59 | [5-methyl-1,2,4-thiadiazole with SC₂H₄SO₃Na] |
| YI-60 | [5-methyl-1,2,4-thiadiazole with Ph] |
| YI-61 | [2-methylbenzoxazole with SO₃Na] |
| YI-62 | [2-methylimidazole with two CN groups and N-CH₂COONa] |

-continued
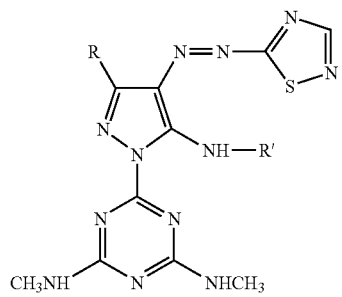
| Pigment | R | R' |
|---|---|---|
| YI-63 | Ph | H |
| YI-64 | OC₂H₅ | C₂H₅ |
| YI-65 | CH₃ | H |
| YI-66 | t-C₄H₉ | H |
| YI-67 | t-C₄H₉ | —C₂H₄COOH |
Pigment YI-68
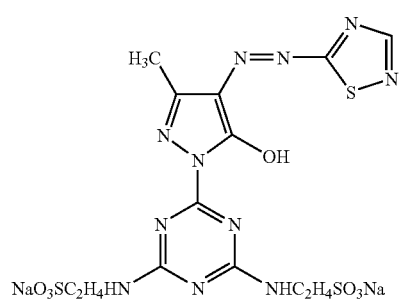
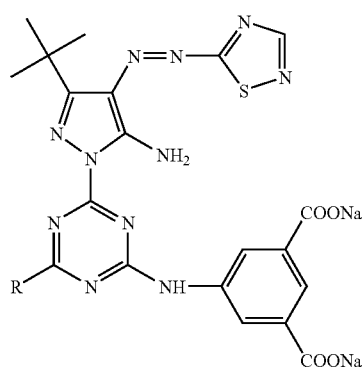
| Pigment | R |
|---|---|
| YI-69 | H |
| YI-70 | OCH₃ |
| YI-71 | OH |
| YI-72 | SO₃Na |
| YI-73 | F |
| YI-74 | 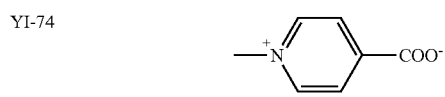 |

-continued
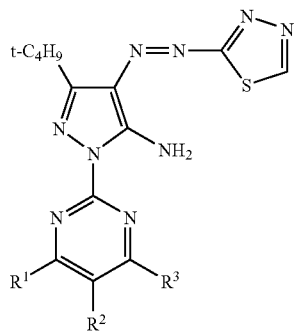
| Pigment | R¹ | R² | R³ |
|---|---|---|---|
| YI-75 | Cl | Cl | Cl |
| YI-76 | Cl | Cl | F |
| YI-77 | Cl | —CONHPh | Cl |
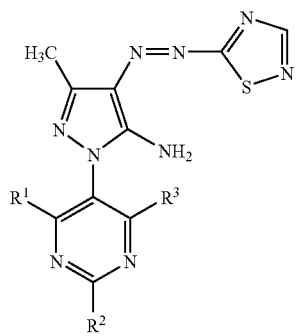
| Pigment | R¹ | R² | R³ |
|---|---|---|---|
| YI-78 | F | H | H |
| YI-79 | Cl | H | F |
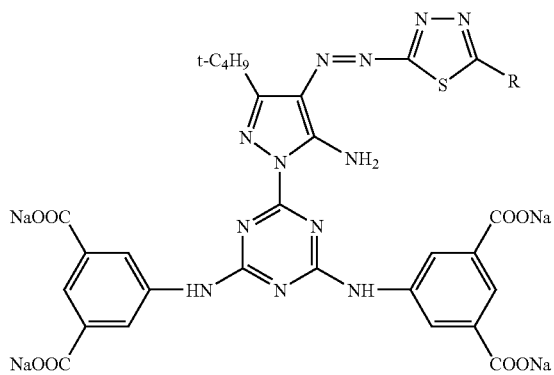
| Pigment | R |
|---|---|
| YI-80 | H |
| YI-81 | $CH_3$ |
| YI-82 | Ph |
| VI-83 | $SCH_2COONa$ |
| YI-84 | $SC_2H_5$ |
| YI-85 | $SC_4H_9$-n |
| YI-86 | $SCH_2CHMe_2$ |
| YI-87 | SCHMeEt |
| YI-88 | $SC_4H_9$-t |
| YI-89 | $SC_7H_{15}$-n |
| YI-90 | $SC_2H_4OC_2H_5$ |
| YI-91 | $SC_2H_4OC_4H_9$-n |
| YI-92 | $SCH_2CF_3$ |

-continued

[Structure: pyrazole with t-C₄H₉, NH₂, N=N linked thiadiazole with SCH₂CHMe₂, and triazine with two R groups]

| Pigment | R |
|---|---|
| YI-93 | —NHC₂H₄COOK |
| YI-94 | —NHC₂H₄SO₃Na |
| YI-95 | —NH—(phenyl with KOOC at 2-position and COOK at 4-position) |
| YI-96 | —NH—(phenyl with KO₃S at 2-position and SO₃K at 4-position) |
| YI-97 | —NH—(phenyl with SO₃Li at 3-position and SO₃Li at 5-position) |
| YI-98 | —NH—(phenyl with COO⁻ NH₄⁺ at 3-position and COO⁻ NH₄⁺ at 5-position) |
| YI-99 | —NHC₆H₁₃-n |
| YI-100 | —N(C₄H₉-n)₂ |
| YI-101 | —N(CH₂COONa)₂ |
| YI-102 | —NH—(phenyl)—SO₃⁻ NH₄⁺ |
| YI-103 | —NH—(phenyl with COO⁻ at 3- and 5-positions, 2Et₃NH⁺) |

The inkjet dark yellow ink of the invention preferably contains from 0.2 to 20% by weight, and more preferably from 0.5 to 15% by weight of the foregoing yellow azo dye.

For the sake of attaining a dark yellow hue, the dark yellow ink of the invention is used upon mixing a dye having absorption in a long wavelength region in addition to the yellow dye.

The dye having a λmax of longer than 470 nm and not longer than 750 nm (black dye) according to the invention will be hereunder described in detail.

In the inkjet recording ink of the invention, it is preferable to use a dye (L) having a λmax of longer than 470 nm and not longer than 750 nm, and preferably from 500 nm to 700 nm and having a half band width ($W\lambda_{1/2}$) of 100 nm or more (preferably from 120 nm to 500 nm, and more preferably from 120 nm to 350 nm) in the absorption spectrum of a diluted solution standardized at an absorbance of 1.0 as the black dye In the invention, the ink is prepared by mixing one or two or more of the black dyes together with the yellow dye and dissolving and/or dispersing the mixture in an aqueous medium. In order to meet the performance preferable as the inkjet recording ink, i.e., (1) weather resistance is excellent, and/or (2) color balance after discoloration is not destroyed, an ink that is satisfied with the following requirements is prepared.

First of all, the ink is printed on a reflection medium so as to form a stepwise pattern (stepwise density), whose reflection spectrum is measured by a spectrophotometer, a point giving a reflection spectrum such that the λmax in a yellow region becomes a point of from 0.90 to 1.10 is selected, the λmax density in the yellow region is defined as ($D_B$), the other λmax density present in a region of longer than 470 nm and not longer than 750 nm is defined as ($D_X$), the printed material is discolored by force using an ozone discoloration tester capable of always generating 5 ppm of ozone, and a forced discoloration rate constant (k) determined from a time (t) when each of the reflection densities $D_B$ and $D_X$ becomes 80% of the initial density is determined from the relational equation, $0.8 = \exp(-k \cdot t)$.

In the invention, the ink is prepared such that the rate constant (k) is not more than $5.0 \times 10^{-2}$ [hour$^{-1}$], preferably not more than $3.0 \times 10^{-2}$ [hour$^{-1}$], and more preferably not more than $1.0 \times 10^{-2}$ [hour$^{-1}$].

Next, among the dyes represented by the formula (2), ones especially corresponding to the dye (L) will be hereunder described in detail.

In the formula (2), $A_{21}$, $B_{21}$, and $C_{21}$ each independently represents an optionally substituted aromatic group or an optionally substituted heterocyclic group ($A_{21}$ and $C_{21}$ are each a monovalent group, and $B_{21}$ is a divalent group); m is 1 or 2; and n represents an integer of 0 or more.

Above all, compounds wherein m and n are each 1 or 2 are preferable. At that time, it is preferable that at least two of $A_{21}$, $B_{21}$, and $C_{21}$ are an optionally substituted, unsaturated heterocyclic group. Especially, the case where m and n are each 1, and at least $B_{21}$ and $C_{21}$ are an unsaturated heterocyclic group is preferable;

It is especially preferable that the azo dye represented by the formula (2) is a dye represented by the following formula (2-1).

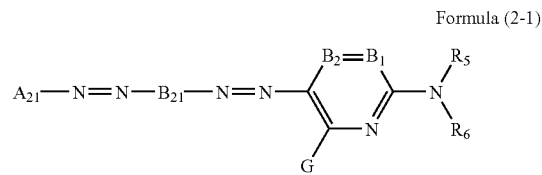

Formula (2-1)

In the formula (2-1), $A_{21}$ and $B_{21}$ are synonymous with those in the formula (2). $B_1$ and $B_2$ each represents =CR$_1$— or —CR$_2$=, or one of them represents a nitrogen atom, and the other represents =CR$_1$— or —CR$_2$=.

G, $R_1$, and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group, and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, or a sulfo group. These respective substituents may further be substituted.

$R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. These respective substituents may further be substituted. However, $R_5$ and $R_6$ cannot represent a hydrogen atom at the same time.

Also, $R_1$ and $R_5$, or $R_5$ and $R_6$ may be taken together to form a 5-membered or 6-membered ring.

It is preferable that the azo dye represented by the formula (2-1) is a dye represented by the following formula

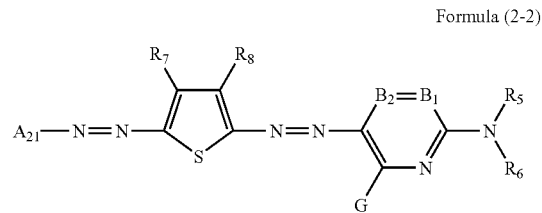

Formula (2-2)

In the formula (2-2), $R_7$ and $R_8$ are synonymous with $R_1$ in the formula (2-1).

Examples of the halogen atom include a fluorine atom, a chlorine atom, and a bromine atom. The aliphatic group means an alkyl group, a substituted alkyl group, an alkenyl group, a substituted alkenyl group, an alkynyl group, a substituted alkynyl group, an aralkyl group, or a substituted aralkyl group. The aliphatic group may be branched or may form a ring. The aliphatic group preferably has from 1 to 20 carbon atoms, and more preferably from 1 to 16 carbon atoms. The alkyl moiety of the aralkyl group and the substituted aralkyl group is preferably phenyl or naphthyl, and especially preferably phenyl. Examples of the aliphatic group include methyl, ethyl, butyl, isopropyl, t-butyl, hydroxyethyl, methoxyethyl, cyanoethyl, trifluoromethyl, 3-sulfopropyl, 4-sulfobutyl, a cyclohexyl group, a benzyl group, a 2-phenethyl group, a vinyl group, and an alkyl group.

The monovalent aromatic group means an aryl group or a substituted aryl group. The aryl group is preferably phenyl or naphthyl, and especially preferably phenyl. The monovalent aromatic group preferably has from 6 to 20 carbon atoms, and more preferably from 6 to 16 carbon atoms. Examples of the monovalent aromatic group include phenyl, p-tolyl, p-methoxyphenyl, o-chlorophenyl, and m-(3 sulfopropylamino)phenyl. The divalent aromatic group means one in which the foregoing monovalent aromatic group is converted so as to have a valency of two, and examples thereof include phenylene, p-tolylene, p-methoxyphenylene, o-chlorophenylene, m-(3-sulfopropyl)amino phenylene, and naphthylene.

The heterocyclic ring includes a substituted heterocyclic ring and an unsubstituted heterocyclic ring. The heterocyclic ring may be fused with an aliphatic ring, an aromatic ring, or other heterocyclic ring. As the heterocyclic ring, 5-membered or 6-membered heterocyclic rings are preferable. Examples of the hetero atom of the heterocyclic ring include N, O, and S. Examples of substituents include an aliphatic group, a halogen atom, an alkylsulfonyl group, an arylsulfonyl group, an acyl group, an acylamino group, a sulfamoyl group, a carbamoyl group, and an ionically hydrophilic group. Examples of the heterocyclic ring used in the monovalent and divalent heterocyclic groups include pyridine, thiophene, thiazole, benzothiazole, benzoxazole, and furan rings.

The carbamoyl group includes a substituted carbamoyl group and an unsubstituted carbamoyl group. Examples of substituents include an alkyl group. Examples of the carbamoyl group include a methylcarbamoyl group and a dimethylcarbamoyl group.

The alkoxycarbonyl group includes a substituted alkoxycarbonyl group and an unsubstituted alkoxycarbonyl group. As the alkoxycarbonyl group, alkoxycarbonyl groups having from 2 to 20 carbon atoms are preferable. Examples of substituents include an ionically hydrophilic group. Examples of the alkoxycarbonyl group include a methoxycarbonyl group and an ethoxycarbonyl group.

The aryloxycarbonyl group includes a substituted aryloxycarbonyl group and an unsubstituted aryloxycarbonyl group. As the aryloxycarbonyl group, aryloxycarbonyl groups having from 7 to 20 carbon atoms are preferable. Examples of substituents include an ionically hydrophilic group. Examples of the aryloxycarbonyl group include a phenoxycarbonyl group.

The heterocyclic oxycarbonyl group includes a substituted heterocyclic oxycarbonyl group and an unsubstituted oxycarbonyl group. As the heterocyclic oxycarbonyl group, heterocyclic oxycarbonyl groups having from 2 to 20 carbon atoms are preferable. Examples of substituents include an ionically hydrophilic group. Examples of the heterocyclic oxycarbonyl group include a 2-pyridyloxycarbonyl group.

The acyl group includes a substituted acyl group and an unsubstituted acyl group. As the acyl group, acyl groups having from 1 to 20 carbon atoms are preferable. Examples of substituents include an ionically hydrophilic group. Examples of the acyl group include an acetyl group and a benzoyl group.

The alkoxy group includes a substituted alkoxy group and an unsubstituted alkoxy group. As the alkoxy group, alkoxy groups having from 1 to 20 carbon atoms are preferable. Examples of substituents include an alkoxy group, a hydroxyl group, and an ionically hydrophilic group. Examples of the alkoxy group include a methoxy group, an ethoxy group, an isopropoxy group, a methoxyethoxy group, a hydroxyethoxy group, and a 3-carboxypropoxy group.

The aryloxy group includes a substituted aryloxy group and an unsubstituted aryloxy group. As the aryloxy group, aryloxy groups having from 6 to 20 carbon atoms are preferable. Examples of substituents include an alkoxy group and an ionically hydrophilic group. Examples of the aryloxy group include a phenoxy group, a p-methoxyphenoxy group, and an o-methoxyphenoxy group.

The heterocyclic oxy group includes a substituted heterocyclic oxy group and an unsubstituted heterocyclic oxy group. As the heterocyclic oxy group, heterocyclic oxy groups having from 2 to 20 carbon atoms are preferable. Examples of substituents include an alkyl group, an alkoxy group, and an ionically hydrophilic group. Examples of the heterocyclic oxy group include a 3-pyridyloxy group and a 3-thienyloxy group.

As the silyloxy group, silyloxy groups on which an aliphatic group or aromatic group having from 1 to 20 carbon atoms is substituted are preferable. Examples of the silyloxy group include trimethylsilyloxy and diphenylmethylsilyloxy.

The acyloxy group includes a substituted acyloxy group and an unsubstituted acyloxy group. As the acyloxy group, acyloxy groups having from 1 to 20 carbon atoms are preferable. Examples of substituents include an ionically hydrophilic group. Examples of the acyloxy group include an acetoxy group and a benzoyloxy group.

The carbamoyloxy group includes a substituted carbamoyloxy group and an unsubstituted carbamoyl group. Examples of substituents include an alkyl group. Examples of the carbamoyloxy group include an N-methylcarbamoyloxy group.

The alkoxycarbonyloxy group includes a substituted alkoxycarbonyloxy group and an unsubstituted alkoxycarbonyloxy group. As the alkoxycarbonyloxy group, alkoxycarbonyloxy groups having from 2 to 20 carbon atoms are preferable. Examples of the alkoxycarbonyloxy group include a methoxycarbonyloxy group and an isopropoxycarbonyloxy group.

The aryloxycarbonyloxy group includes a substituted aryloxycarbonyloxy group and an unsubstituted aryloxycarbonyloxy group. As the aryloxycarbonyloxy group, aryloxycarbonyloxy groups having from 7 to 20 carbon atoms are preferable. Examples of the aryloxycarbonyloxy group include a phenoxycarboyloxy group.

The amino group includes an amino group substituted with an alkyl group, an aryl group or a heterocyclic group. The alkyl group, aryl group or heterocyclic group may further be substituted. As the alkylamino group, alkylamino groups having from 1 to 20 carbon atoms are preferable. Examples of substituents include an ionically hydrophilic group. Examples of the alkylamino group include a methylamino group and a diethylamino group.

The arylamino group includes a substituted arylamino group and an unsubstituted arylamino group. As the arylamino group, arylamino groups having from 6 to 20 carbon atoms are preferable. Examples of substituents include a halogen atom and an ionically hydrophilic group. Examples of the arylamino group include an anilino group and a 2-chlorophenylamino group.

The heterocyclic amino group includes a substituted heterocyclic amino group and an unsubstituted heterocyclic amino group. As the heterocyclic amino group, heterocyclic amino groups having from 2 to 20 carbon atoms are preferable. Examples of substituents include an alkyl group, a halogen atom, and an ionically hydrophilic group.

The acylamino group includes a substituted acylamino group and an unsubstituted acylamino group. As the acylamino group, acylamino groups having from 2 to 20 carbon atoms are preferable. Examples of substituents include an ionically hydrophilic group. Examples of the acylamino group include an acetylamino group, a propionylamino group, a benzoylamino group, an N-phenylacetylamino group, and a 3,5-disulfobenzoylamino group.

The ureido group includes a substituted ureido group and an unsubstituted ureido group. As the ureido group, ureido groups having from 1 to 20 carbon atoms are preferable. Examples of substituents include an alkyl group and an aryl group. Examples of the ureido group include a 3-methylureido group, a 3,3-dimethylureido group, and a 3-phenylureido group.

The sulfamoylamino group includes a substituted sulfamoylamino group and an unsubstituted sulfamoylamino group. Examples of substituents include an alkyl group. Examples of the sulfamoylamino group include N,N-dipropylsulfamoylamino group.

The alkoxycarbonylamino group includes a substituted alkoxycarbonylamino group and an unsubstituted alkoxycarbonylamino group. As the alkoxycarbonylamino group, alkoxycarbonylamino groups having from 2 to 20 carbon atoms are preferable. Examples of substituents include an ionically hydrophilic group. Examples of the alkoxycarbonylamino group include an ethoxycarbonylamino group.

The aryloxycarbonylamino group includes a substituted aryloxycarbonylamino group and an unsubstituted aryloxycarbonylamino group. As the aryloxycarbonylamino group, aryloxycarbonylamino groups having from 7 to 20 carbon atoms are preferable. Examples of substituents include an ionically hydrophilic group. Examples of the aryloxycarbonylamino group include a phenoxycarbonylamino group.

The alkylsulfonylamino group and the arylsulfonylamino group include a substituted alkylsulfonylamino group or arylsulfonylamino group and an unsubstituted alkylsulfonylamino group or arylsulfonylamino group. As the sulfonylamino group, sulfonylamino groups having from 1 to 20 carbon atoms are preferable. Examples of substituents include an ionically hydrophilic group. Examples of the sulfonylamino group include a methylsulfonylamino group, an N-phenylmethylsulfonylamino group, a phenylsulfonylamino group, and a 3-carboxyphenylsulfonylamino group.

The heterocyclic sulfonylamino group includes a substituted heterocyclic sulfonyl group and an unsubstituted heterocyclic sulfonylamino group. As the heterocyclic sulfonylamino group, heterocyclic sulfonylamino groups having from 1 to 12 carbon atoms are preferable. Examples of substituents include an ionically hydrophilic group. Examples of the heterocyclic sulfonylamino group include a 2-thiophenesulfonylamino group and a 3-pyridinesulfonylamino group.

The heterocyclic sulfonyl group includes a substituted heterocyclic sulfonyl group and an unsubstituted heterocyclic sulfonyl group. As the heterocyclic sulfonyl group, heterocyclic sulfonyl groups having from 1 to 20 carbon atoms are preferable. Examples of substituents include an ionically hydrophilic group. Examples of the heterocyclic sulfonyl group include a 2-thiophenesulfonyl group and a 3-pyridinesulfonyl group.

The heterocyclic sulfinyl group includes a substituted heterocyclic sulfinyl group and an unsubstituted heterocyclic sulfinyl group. As the heterocyclic sulfinyl group, heterocyclic sulfinyl groups having from 1 to 20 carbon atoms are preferable. Examples of substituents include an ionically hydrophilic group. Examples of the heterocyclic sulfinyl group include a 4-pyridinesulfinyl group.

The alkylthio group, arylthio group and heterocyclic thio group include a substituted alkylthio group, arylthio group or heterocyclic thio group and an unsubstituted alkylthio group, arylthio group or heterocyclic thio group. As the alkylthio group, arylthio group and heterocyclic thio group, those having from 1 to 20 carbon atoms are preferable Examples of substituents include an ionically hydrophilic group. Examples of the alkylthio group, arylthio group and heterocyclic thio group include a methylthio group, a phenylthio group, and a 2-pyridylthio group.

The alkylsulfonyl group and the arylsulfonyl group include a substituted alkylsulfonyl group or arylsulfonyl group and an unsubstituted alkylsulfonyl group or arylsulfonyl group. Examples of the alkylsulfonyl group and the arylsulfonyl group include a methylsulfonyl group and a phenylsulfonyl group.

The alkylsulfinyl group and the arylsulfinyl group include a substituted alkylsulfinyl group or arylsulfinyl group and an unsubstituted alkylsulfinyl group or arylsulfinyl group. Examples of the alkylsulfinyl group and the arylsulfinyl group include a methylsulfinyl group and a phenylsulfinyl group.

The sulfamoyl group includes a substituted sulfamoyl group and an unsubstituted sulfamoyl group. Examples of substituents include an alkyl group. Examples of the sulfamoyl group include a dimethylsulfamoyl group and a di-(2-hydroxyethyl)sulfamoyl group.

Next, the formulae (2), (2-1) and (2-2) will be described.

In the following description, with respect to the groups and substituents, those already described are applied.

In the formula (2), $A_{21}$, $B_{21}$, and $C_{21}$ each independently represents an optionally substituted aromatic group ($A_{21}$, and $C_{21}$ each represents a monovalent aromatic group such as an aryl group; and $B_{21}$ represents a divalent aromatic group such as an arylene group) Or an optionally substituted heterocyclic group ($A_{21}$ and $C_{21}$ each represents a monovalent heterocyclic group; and $B_{21}$ represents a divalent heterocyclic group). Examples of the aromatic group include a benzene ring and a naphthalene ring; and examples of the hetero atom of the heterocyclic ring include N, O, and S. The heterocyclic ring may be fused with an aliphatic ring, an aromatic ring, or other heterocyclic ring.

The substituent may be an aryl azo group or a heterocyclic azo group.

Also, at least two of $A_{21}$, $B_{21}$, and $C_{21}$ preferably represent a heterocyclic group.

As the preferable heterocyclic group of $C_{21}$, an aromatic nitrogen-containing 6-membered heterocyclic group represented by the following formula (2-3) is enumerated. In the case where $C_{21}$ represents an aromatic nitrogen-containing 6-membered heterocyclic group represented by the following formula (2-3), the formula (2) in corresponding to the formula (2-1).

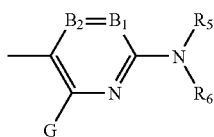

Formula (2-3)

In the formula (2-3), $B_1$ and $B_2$ each independently represents $=CR_1-$ or $-CR_2=$, or one of them represents a nitrogen atom, and the other represents $=CR_1-$ or $-CR_2=$. It is more preferable that $B_1$ and $B_2$ each represents $=CR_1-$ or $-CR_2=$.

$R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. These respective substituents may further be substituted. The substituents represented by $R_5$ and $R_6$ are preferably a hydrogen atom, an aliphatic group, an aromatic group, a heterocyclic group, an acyl group, an alkylsulfonyl group, or an arylsulfonyl group; more preferably a hydrogen atom, an aromatic group, a heterocyclic group, an acyl group, an alkylsulfonyl group, or an arylsulfonyl group; and most preferably a hydrogen atom, an aryl group, or a heterocyclic group. These respective groups may further be substituted. However, $R_5$ and $R_6$ cannot represent a hydrogen atom at the same time.

G, $R_1$, and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group, and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, or a sulfo group. These respective groups may further be substituted.

As the substituent represented by G, a hydrogen atom, a halogen atom, an aliphatic group, an aromatic group, a hydroxyl group, an alkoxy group, an aryloxy group, an acyloxy group, a heterocyclic oxy group, an amino group (including an alkylamino group, an arylamino group, and a heterocyclic amino group), an acylamino group, a ureido group, a sulfamoylamino group, an alkoxycarbonylamino group, an aryloxycarbonylamino group, an alkylthio group, an arylthio group, and a heterocyclic thio group are preferable; a hydrogen atom, a halogen atom, an alkyl group, a hydroxyl group, an alkoxy group, an aryloxy group, an acyloxy group, an amino group (including an alkylamino group, an arylamino group, and a heterocyclic amino group), and an acylamino group are more preferable; and a hydrogen atom, an anilino group, and an acylamino group are most preferable. These respective groups may further be substituted.

As the substituents represented by $R_1$ and $R_2$, a hydrogen atom, an alkyl group, a halogen atom, an alkoxycarbonyl group, a carboxyl group, a carbamoyl group, a hydroxyl group, an alkoxy group, and a cyano group are preferable. These respective groups may further be substituted.

$R_1$ and $R_5$, or $R_5$ and $R_6$ may be taken together to form a 5-membered or 6-membered ring.

In the case where each of the substituents represented by $A_{21}$, $R_1$, $R_2$, $R_5$, $R_6$, and G is further substituted, examples of substituents include those enumerated above for G, $R_1$, and $R_2$. Also, it is preferable that an ionically hydrophilic group is further present as a substituent at any position on $A_{21}$, $R_1$, $R_2$, $R_5$, $R_6$, and G.

The ionically hydrophilic group as the substituent includes a sulfo group, a carboxyl group, a phosphono group, and a quaternary ammonium group. As the ionically hydrophilic group, a carboxyl group, a phosphono group, and a sulfo group are preferable; and a carboxyl group and a sulfo group are especially preferable. The carboxyl group, the phosphono group, and the sulfo group may be in the state of a salt. Examples of counter ions for forming a salt include an ammonium ion, an alkali metal ion (such as a lithium ion, a sodium ion, and a potassium ion), and an organic cation (such as a tetramethylammonium ion, a tetramethylguanidium ion, and a tetramethylphosphonium ion).

When $B_{21}$ is of a ring structure, preferred examples of the heterocyclic ring include a thiophene ring, a thiazole ring, an imidazole ring, a benzothiazole ring, and a thienothiazole ring. These respective substituents may further be substituted. Above all, a thiophene ring, a thiazole ring, an imidazole ring, a benzothiazole ring, and a thienothiazole ring represented by the following formulae (a) to (e) are preferable. Incidentally, when m and n are each 1, $B_{21}$ is the thiophene ring represented by (a), and when $C_{21}$ is the structure represented by the foregoing formula (2-3), the formula (2) is corresponding to the formula (2-2).

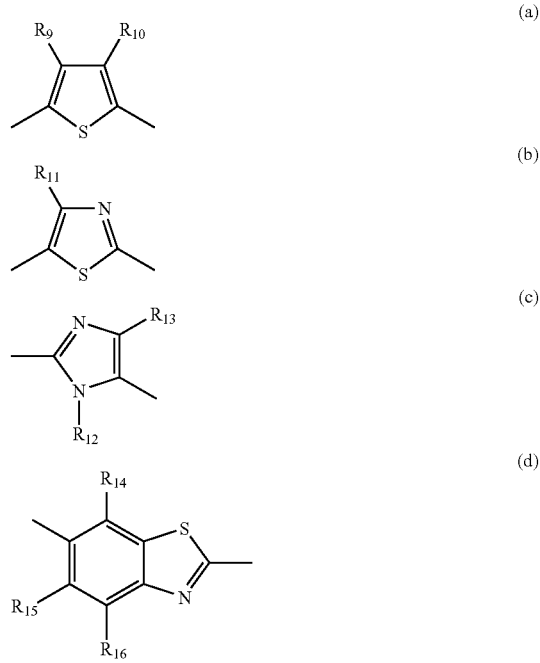

-continued

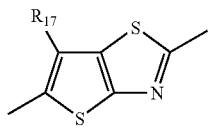

(e)

In the formulae (a) to (e), $R_9$ to $R_{17}$ represent substituents synonymous with those for G, $R_1$, and $R_2$ in the formula (2-1).

In the invention, a structure represented by the following formula (2-4) is especially preferable.

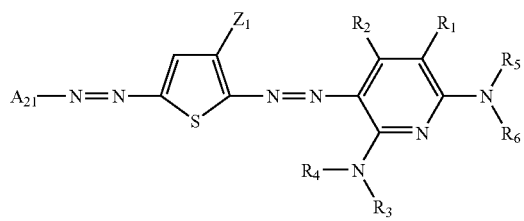

Formula (2-4)

In the formula, $Z_1$ represents an electron withdrawing group having a Hammett's substituent constant σp value of 0.20 or more. $Z_1$ is preferably an electron withdrawing group having a σp value of 0.30 or more, more preferably an electron withdrawing group having a σp value of 0.45 or more, and especially preferably an electron withdrawing group having a σp value of 0.60 or more, but it is desired that the σp value does not exceed 1.0. As preferred specific examples of the substituent, electron withdrawing substituents described later can be enumerated. Above all, an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms, and a halogenated alkyl group having from 1 to 20 carbon atoms are preferable. A cyano group, an alkylsulfonyl group having from 1 to 20 carbon atoms, and an arylsulfonyl group having from 6 to 20 carbon atoms are especially preferable; and a cyano group is most preferable.

$R_1$, $R_2$, $R_5$, and $R_6$ are synonymous with those in the formula (2-1). $R_3$ and $R_4$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. Above all, a hydrogen atom, an aromatic group, a heterocyclic group, an acyl group, an alkylsulfonyl group, and an arylsulfonyl group are preferable; and a hydrogen atom, an aromatic group, and a heterocyclic group are especially preferable.

The respective substituents described in the formula (2-4) may further be substituted. In the case where these respective substituents are further substituted, examples of substituents include the substituents described in the formula (2-1), the groups enumerated for G, $R_1$, and $R_2$, and an ionically hydrophilic group.

The Hammett's substituent constant σp value as referred to in this specification will be described. The Hammett's rule is a rule of thumb advocated by L. P. Hammett in 1935 for the sake of quantitatively discussing influences of substituents against reaction or equilibrium of benzene derivatives, whose appropriateness is widely admitted at present. The substituent constants determined by the Hammett's rule include a σp value and σm value. These values can be found in a number of general books. For example, the details are given in Lange's Handbook of Chemistry, 12$^{th}$ Edition, edited by J. A. Dean, 1979 (McGraw-Hill) and Kagaku No Ryoiki (Regions of Chemistry), Extra Number, Vol. 122, pages 99 to 103 (1979) (Nankodo). Incidentally, in the invention, the respective substituents are limited or described in terms of a Hammett's substituent constant σp, but it is not meant that the invention is limited to only the substituents that are found in the foregoing books and whose values are known by literatures. As a matter of course, the invention also includes substituents whose values are not known by any literatures but will fall within the scope when measured based on the Hammett's rule. Also, the formula (1) or (2) of the invention includes non-benzene derivatives, but the invention employs the σp value as a measure showing an electronic effect of the substituent regardless of the substitution position. In the invention, the σp value is employed in these meanings.

Examples of electron withdrawing groups having a Hammett's substituent constant σp value of 0.60 or more include a cyano group, a nitro group, an alkylsulfonyl group (such as a methanesulfonyl group), and an arylsulfonyl group (such as a benzenesulfonyl group).

Examples of electron withdrawing groups having a Hammett's substituent constant σp value of 0.45 or more include an acyl group (such as an acetyl group), an alkoxycarbonyl group (such as a dodecyloxycarbonyl group), an aryloxycarbonyl group (such as m-chlorophenoxycarbonyl), an alkylsulfinyl group (such as n-propylsulfinyl), an arylsulfinyl group (such as phenylsulfinyl), a sulfamoyl group (such as N-ethylsulfamoyl and N,N-dimethylsulfamoyl), and a halogenated alkyl group (such as trifluoromethyl) in addition to those described above.

Examples of electron withdrawing groups having a Hammett's substituent constant σp value of 0.30 or more include an acyloxy group (such as acetoxy), a carbamoyl group (such as N-ethylcarbamoyl and N,N-dibutylcarbamoyl), a halogenated alkoxy group (such as trifluoromethyloxy), a halogenated aryloxy group (such as pentafluorophenyloxy), a sulfonyloxy group (such as a methylsulfonyloxy group), a halogenated alkylthio group (such as difluoromethylthio), an aryl group substituted with two or more electron withdrawing groups having a σp value of 0.15 or more (such as 2,4-dinitrophenyl and pentachlorophenyl), and a heterocyclic ring (such as 2-benzoxazolyl, 2-benzothiazolyl, and 1-phenyl-2-benzimidazolyl) in addition to those described above.

Examples of electron withdrawing groups having a Hammett's substituent constant σp value of 0.20 or more include a halogen atom in addition to those described above.

With respect to the combination of substituents especially preferable as the azo dye represented by the foregoing formula (2-2), $R_5$ and $R_6$ each preferably represents a hydrogen atom, an alkyl group, an aryl group, a heterocyclic group, a sulfonyl group, or an acyl group; more preferably a hydrogen atom, an aryl group, a heterocyclic group, or a sulfonyl group; and most preferably a hydrogen atom, an aryl group, or a heterocyclic group. However, $R_5$ and $R_6$ cannot represent a hydrogen atom at the same time.

G preferably represents a hydrogen atom, a halogen atom, an alkyl group, a hydroxyl group, an amino group, or an acylamino group; more preferably a hydrogen atom, a halogen atom, an amino group, or an acylamino group; and most preferably a hydrogen atom, an amino group, or an acylamino group.

$A_{21}$ preferably represents an aromatic group, a pyridine ring, a pyrazole ring, an imidazole ring, an isothiazole ring, a benzoisothiazole ring, a thiadiazole ring, a thiazole group, a benzothiazole ring, or a triazole ring; more preferably an aromatic ring, a pyridine ring, an isothiazole ring, a benzoisothiazole ring, a thiadiazole ring, or a benzothiazole ring; and most preferably an aromatic ring, a pyridine ring, or a benzothiazole ring.

$B_1$ and $B_2$ each represents =CR$_1$— or —CR$_2$=. $R_1$ and $R_2$ each preferably represents a hydrogen atom, an alkyl group, a halogen atom, a cyano group, a carbamoyl group, a carboxyl group, a hydroxyl group, an alkoxy group, or an alkoxycarbonyl group; and more preferably a hydrogen atom, an alkyl group, a carboxyl group, a cyano group, or a carbamoyl group.

Incidentally, with respect to the preferred combination of substituents regarding the compound represented by the foregoing formula (2), compounds in which at least one of the various substituents is the foregoing preferred group are preferable; compounds in which most of the various substituents are the foregoing preferred groups are more preferable; and compounds in which all of the substituents are the foregoing preferred groups are most preferable.

Specific examples of the azo dye represented by the foregoing formula (2) will be given below, but it should not be construed that the azo dye to be used in the invention are limited to the following examples. Also, the carboxyl group, the phosphono group, and the sulfo group may be in the state of a salt. Examples of counter ions for forming a salt include an ammonium ion, an alkali metal ion (such as a lithium ion, a sodium ion, and a potassium ion), and an organic cation (such as a tetramethylammonium ion, a tetramethylguanidium ion, and a tetramethylphosphonium ion).

TABLE 1

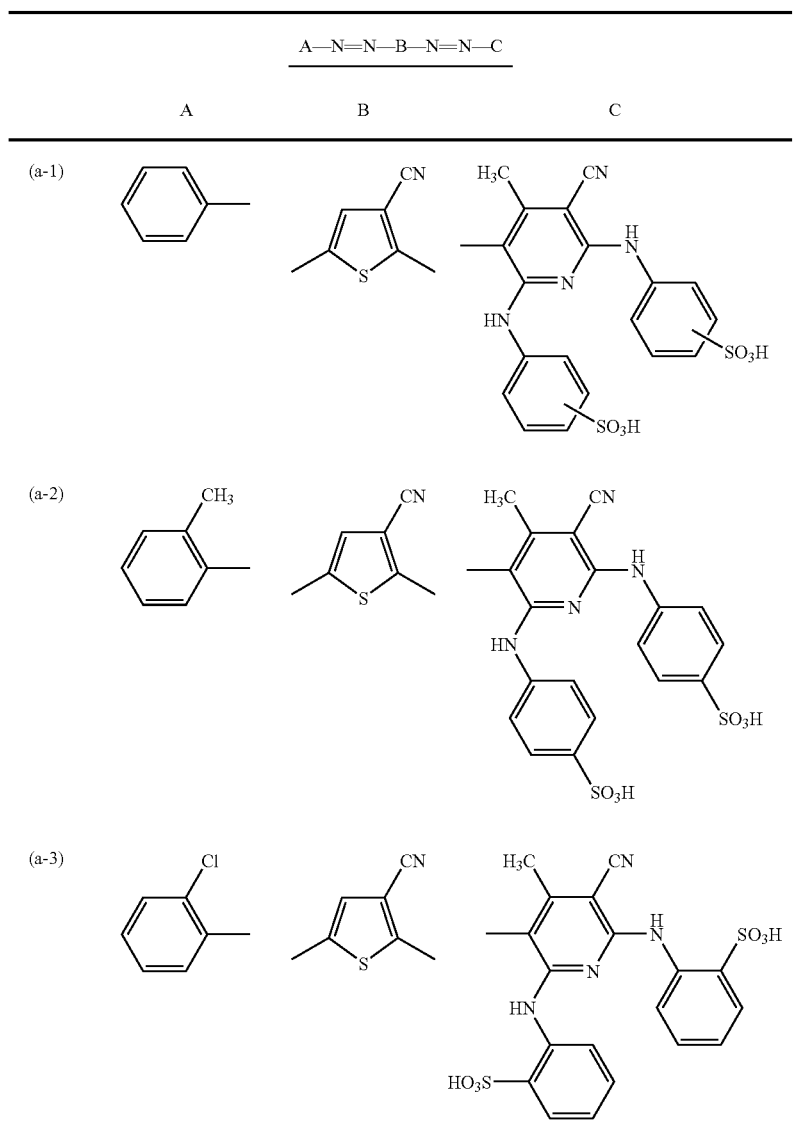

TABLE 1-continued

A—N=N—B—N=N—C

| | A | B | C |
|---|---|---|---|
| (a-4) | | | |
| (a-5) | | | |
| (a-6) | | | |

TABLE 2

A—N=N—B—N=N—C

| | A | B | C |
|---|---|---|---|
| (b-1) | | | |

TABLE 2-continued
A—N=N—B—N=N—C
| | A | B | C |
|---|---|---|---|
| (b-2) | 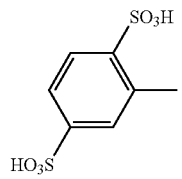 | 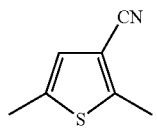 | 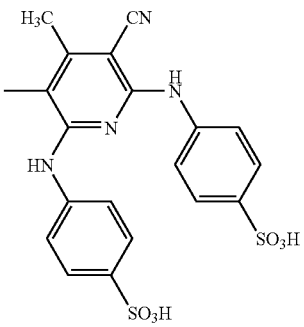 |
| (b-3) | 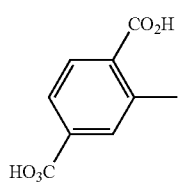 | 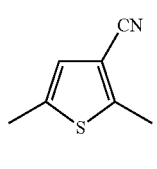 | 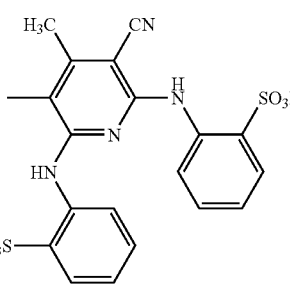 |
| (b-4) | 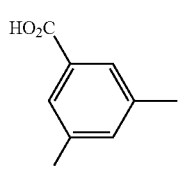 | 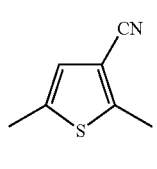 | 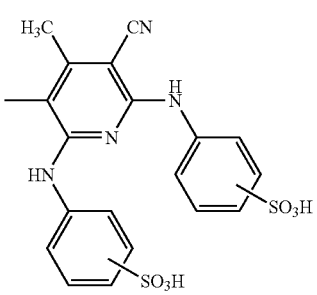 |
| (b-5) | 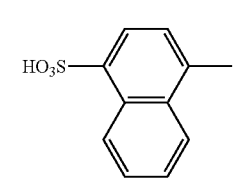 | 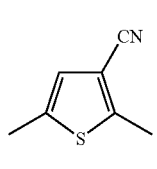 | 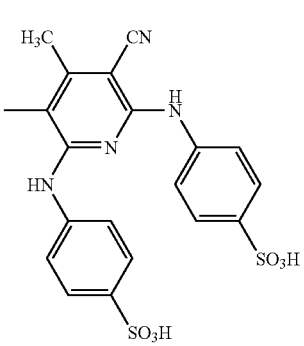 |
| (b-6) | 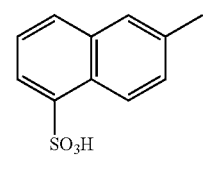 | 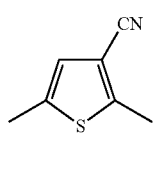 | 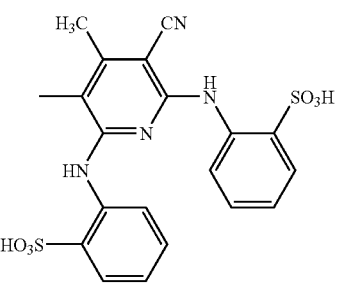 |

TABLE 2-continued

A—N=N—B—N=N—C

| | A | B | C |
|---|---|---|---|
| (b-7) | HO₃S-naphthalene(CH₃)-SO₃H | 2,5-dimethyl-3-cyanothiophene | 4-methyl-3-cyano-5-methyl-2,6-bis[(sulfophenyl)amino]pyridine |

TABLE 3

A—N=N—B—N=N—C

| | A | B | C |
|---|---|---|---|
| (c-1) | 2-methylthio-5-methyl-1,3,4-thiadiazole | 2,4,5-trimethyl-3-cyanothiophene | 4-methyl-3-cyano-5-methyl-2,6-bis[(sulfophenyl)amino]pyridine |
| (c-2) | 2-methylthiazole | methyl 2,5-dimethyl-4-phenylthiophene-3-carboxylate | 4-methyl-3-carbamoyl-5-methyl-2,6-bis[(sulfophenyl)amino]pyridine |
| (c-3) | 2-methylbenzothiazole | 2,5-dimethyl-4-phenyl-3-cyanothiophene | 4-methyl-3-cyano-5-methyl-2,6-bis[(carboxyphenyl)amino]pyridine |

TABLE 3-continued
A—N=N—B—N=N—C
| | A | B | C |
|---|---|---|---|
| (c-4) | 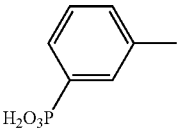 | 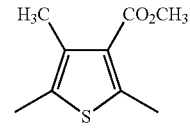 | 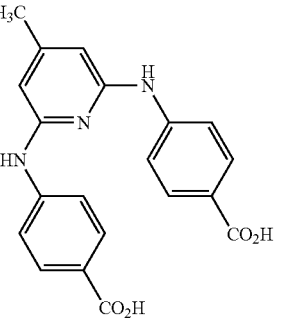 |
| (c-5) | 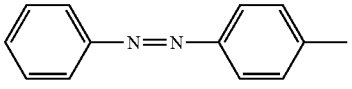 | 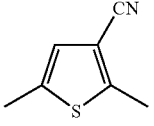 | 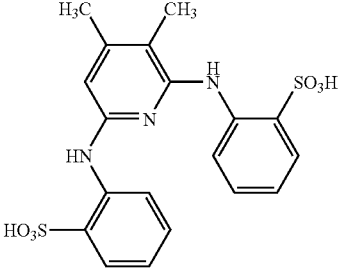 |
TABLE 4
A—N=N—B—N=N—C
| | A | B | C |
|---|---|---|---|
| (d-1) | 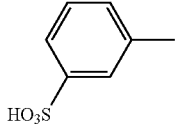 | 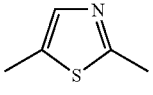 | 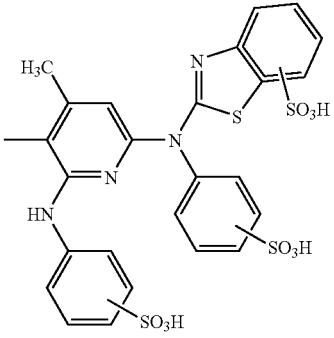 |
| (d-2) | 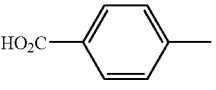 | 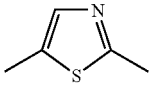 | 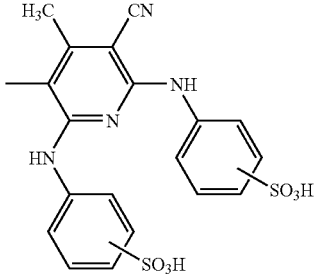 |

TABLE 4-continued
A—N=N—B—N=N—C
| | A | B | C |
|---|---|---|---|
| (d-3) | 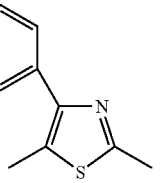 | 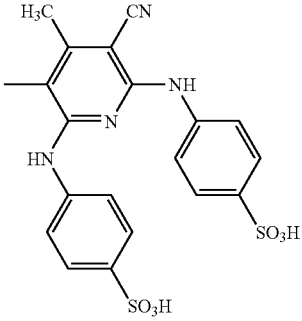 | 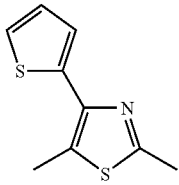 |
| (d-4) | 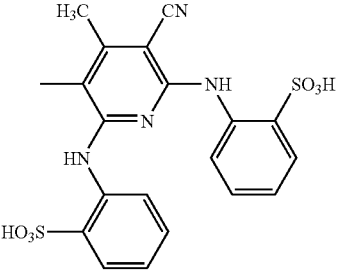 | 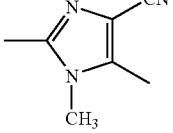 | 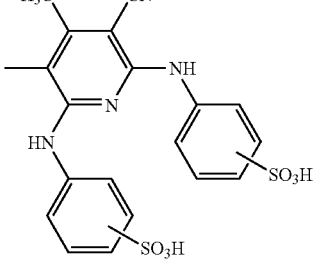 |
| (d-5) | 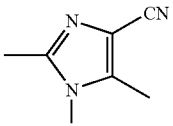 | 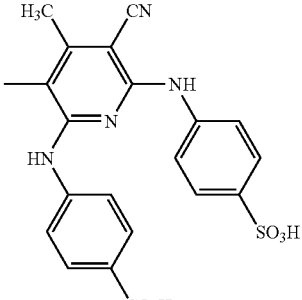 | |
| (d-6) | | | |

TABLE 5
A—N=N—B—N=N—C
| | A | B | C |
|---|---|---|---|
| (e-1) | 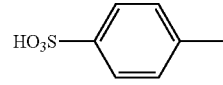 | 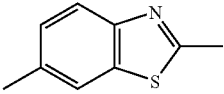 | 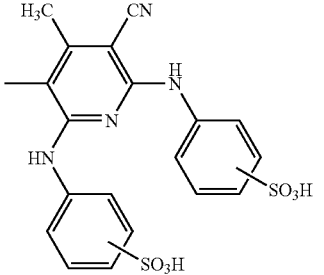 |
| (e-2) | 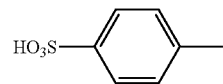 | 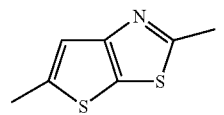 | 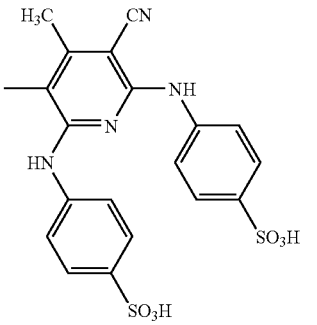 |
TABLE 6
A—N=N—B—N=N—C
| | A | B | C |
|---|---|---|---|
| (f-1) | 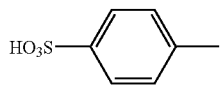 | 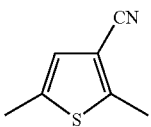 | 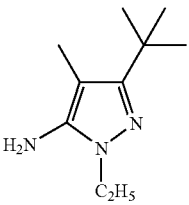 |
| (f-2) | 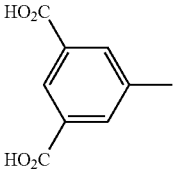 | 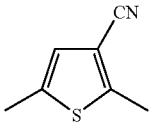 | 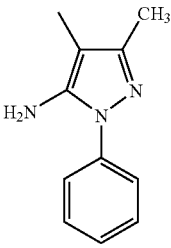 |

TABLE 6-continued

A—N=N—B—N=N—C

| A | B | C |
|---|---|---|

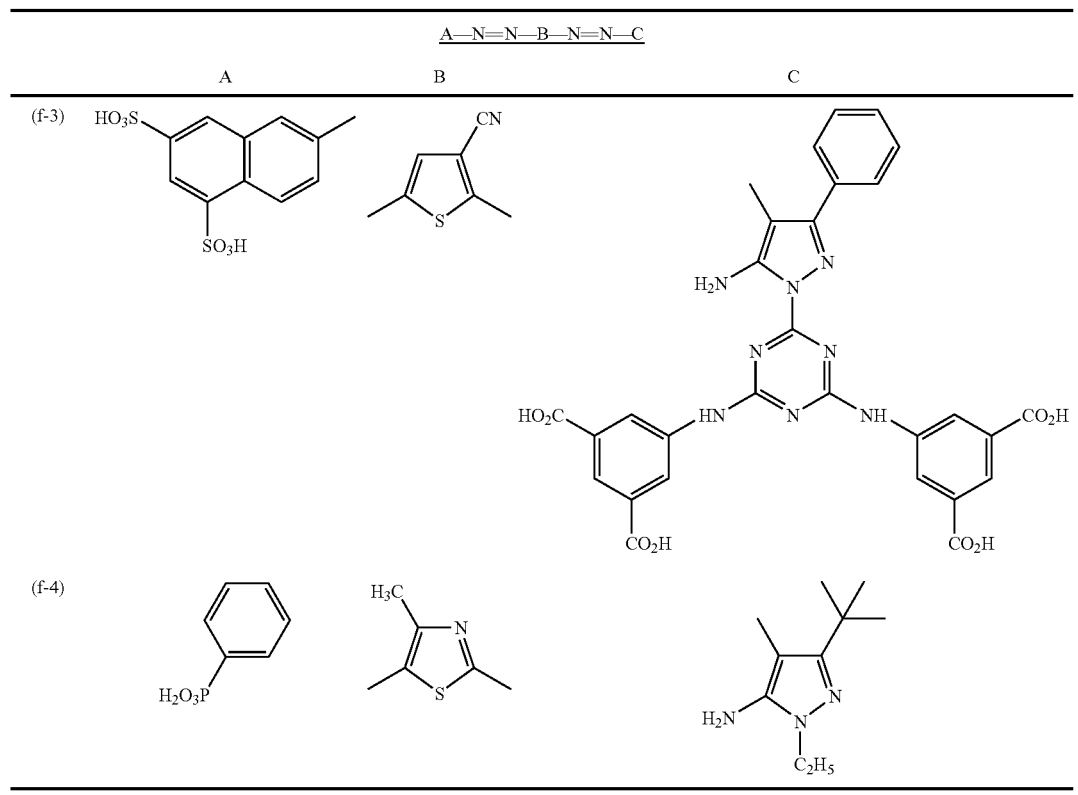

(f-3), (f-4)

The dyes represented by the foregoing formulae (2), (2-1), (2-2), and (2-4) can be synthesized by coupling reaction of a diazo compound and a coupler. With respect to the major synthesis method, the dyes can be synthesized according to the methods described in Japanese Patent Application No. 2002-113460.

In the case where single usage of this dye (L) enables one to realize (steady) black with high image quality (without relying upon observation light source) by which any color tone of B, G and R is hardly emphasized, it is possible to use this single dye and the foregoing yellow dye as the dark yellow ink dye. But, it is general to combine this dye with a dye capable of covering a region in which absorption of the former dye is low and use the mixed dye as a black dye. Usually, the dye is used together with a dye or pigment having main absorption in a yellow region, thereby realizing preferable black. As the yellow dye, in addition to the yellow dyes set forth in claim 1, direct dyes and acid dyes represented by usually employed azo pigments and azomethine pigments can be used. As the pigment, aqueous dispersions of pigments to which the pigment number is assigned can be used together.

In any of the cases, dyes having the foregoing oxidation potential (Eox) of 1.0 V (vs SCE) are preferable; and dyes having an Eox of 1.2 V (vs SCE) are especially preferable.

The inkjet recording dark yellow ink of the invention contains the dye (black dye) having a λmax of longer than 470 nm and not longer than 750 nm in an amount of from 0.001 to 10% by weight, and preferably from 0.005 to 5% by weight of the whole of the ink.

The dark yellow ink of the invention is characterized in that the yellow dye is used together with the black dye having a λmax of longer than 470 nm and not longer than 750 nm. When the dyes are used together, the addition weight amount of the black dye is preferably from 0.01 to 50%, more preferably from 0.02 to 25%, still more preferably from 0.1 to 15%, and still further more preferably from 1 to 10% with respect to the addition weight amount of the yellow dye.

As the yellow dye, yellow pigments and yellow dyes described later may be used together.

The yellow dye and the black dye having a λmax of longer than 470 nm and not longer than 750 nm according to the invention are substantially water-soluble or water-dispersible. Especially, it is preferable that in the dye-containing ink composition of the invention, the dyes are water-soluble and that the ink composition is of a solution type. Concretely, the solubility of the dyes in water at 20° C. is preferably 2% by weight or more, and more preferably 5% by weight or more.

In the invention, it is preferable that a pigment other than the yellow dye and the black dye having a λmax of longer than 470 nm and not longer than 750 nm is substantially water-soluble or water-dispersible. Concretely, the solubility of the pigment in water at 20° C. is preferably 2% by weight or more, and more preferably 5% by weight or more.

As dyes that can be used together with the dyes of the invention, dyes known in the art, such as triarylmethane dyes, anthraquinone dyes, anthrapyridone dyes, azomethine dyes, azo dyes, cyanine dyes, merocyanine dyes, and oxonole dyes, can be used singly or in admixture. Above all, azo dyes are especially preferable.

More specifically, examples of yellow dyes include aryl or heteryl azo dyes having, for example, phenols, naphthols, anilines, pyrazolones, pyridones, or open chain active methylene compounds as a coupling component; azomethine dyes having, for example, open chain active methylene compounds as a coupling component; methine dyes such as benzylidene dyes and monomethine oxonole dyes; and quinone based dyes such as naphthoquinone dyes and anthraquinone dyes. Examples of other dye species include quinophthalone dyes, nitro-nitroso dyes, acridine dyes, and acridinone dyes. These dyes may be ones in which a part of chromophore is dissociated to first exhibit yellow. In this case, the counter cation may be an inorganic cation such as alkali metals and ammonium or an organic cation such as pyridinium and quaternary ammonium salts, and may be a polymer cation having such a cation in the partial structure thereof.

Examples of magenta dyes include aryl or heteryl azo dyes having, for example, phenols, naphthols, or anilines as a coupling component; azomethine dyes having, for example, pyrazolones or pyrazolotriazoles as a coupling component; methine dyes such as arylidene dyes, styryl dyes, merocyanine dyes, and oxonole dyes; carbonium dyes such as diphenylmethane dyes, triphenylmethane dyes, and xanthene dyes; quinone based dyes such as naphthoquinone, anthraquinone, and anthrapyridone; and fused polycyclic dyes such as dioxazine dyes. These dyes may be ones in which a part of chromophore is dissociated to first exhibit magenta. In this case, the counter cation may be an inorganic cation such as alkali metals and ammonium or an organic cation such as pyridinium and quaternary ammonium salts, and may be a polymer cation having such a cation in the partial structure thereof.

Examples of cyan dyes include azomethine dyes such as indoaniline dyes and indophenol dyes; polymethine dyes such as cyanine dyes, oxonole dyes, and merocyanine dyes; carbonium dyes such as diphenylmethane dyes, triphenylmethane dyes, and xanthene dyes; phthalocyanine dyes; anthraquinone dyes; aryl or heteryl azo dyes having, for example, phenols, naphthols, or anilines as a coupling component; and indigo.thioindigo dyes. These dyes may be ones in which a part of chromophore is dissociated to first exhibit cyan. In this case, the counter cation may be an inorganic cation such as alkali metals and ammonium or an organic cation such as pyridinium and quaternary ammonium salts, and may be a polymer cation having such a cation in the partial structure thereof.

Examples of water-soluble dyes include direct dyes, acid dyes, food dyes, basic dyes, and reactive dyes. The following dyes are preferable.

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, 247

C.I. Direct Violet 7, 9, 47, 48, 51, 66, 90, 93, 94, 95, 98, 100, 101

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, 163

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397

C.I. Acid Violet 5, 34, 43, 47, 48, 90, 103, 126

C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227

C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326

C.I. Acid Black 7, 24, 29, 48, 52:1, 172

C.I. Reactive Red 3, 13, 17, 19, 21, 22, 23, 24, 29, 35, 37, 40, 41, 43, 45, 49, 55

C.I. Reactive Violet 1, 3, 4, 5, 6, 7, 8, 9, 16, 17, 22, 23, 24, 26, 27, 33, 34

C.I. Reactive Yellow 2, 3, 13, 14, 15, 17, 18, 23, 24, 25, 26, 27, 29, 35, 37, 41, 42

C.I. Reactive Blue 2, 3, 5, 8, 10, 13, 14, 15, 17, 18, 19, 21, 25, 26, 27, 28, 29, 38

C.I. Reactive Black 4, 5, 8, 14, 21, 23, 26, 31, 32, 34

C.I. Basic Red 12, 13, 14, 15, 18, 22, 23, 24, 25, 27, 29, 35, 36, 38, 39, 45, 46

C.I. Basic Violet 1, 2, 3, 7, 10, 15, 16, 20, 21, 25, 27, 28, 35, 37, 39, 40, 48

C.I. Basic Yellow 1, 2, 4, 11, 13, 14, 15, 19, 21, 23, 24, 25, 28, 29, 32, 36, 39, 40

C.I. Basic Blue 1, 3, 5, 7, 9, 22, 26, 41, 45, 46, 47, 54, 57, 60, 62, 65, 66, 69, 71

C.I. Basic Black 8

Also, as other pigments that can be used together, the foregoing dyes and the following pigments can be enumerated.

As the pigments that can be used in the invention, commercially available pigments and known pigments described in various literatures can be utilized. Examples of literatures include *Color Index*, edited by The Society of Dyers and Colourists; *Kaitei Shin-Pan Ganryo Binran* (Revised New Edition, Pigment Handbook), edited by Nippon Ganryo Pigment Kyokai (1989); *Saishin Ganryo Ohyo Gijutsu* (Current Pigment Application Technologies), published by CMC Publishing co., Ltd. (1986); *Insatsu Inki Gijutsu* (Printing Ink Technologies), published by CMC Publishing Co., Ltd. (1984); and W. Herbst and K. Hunger, *Industrial Organic Pigments*, published by VCHV Verlagsgesellschaft (1993). Specifically, examples of organic pigments include azo pigments (such as azo lake pigments, insoluble azo pigments, condensed azo pigments, and chelate azo pigments), polycyclic pigments (such as phthalocyanine based pigments, anthraquinone based pigments, perylene based pigments, perinone based pigments, indigo based pigments, quinacridone based pigments, dioxazine based pigments, isoindolinone based pigments, quinophthalone based pigments, and diketopyrogallol based pigments), dyeing lake pigments (such as lake pigments of acid or basic dyes), and azine pigments; and examples of inorganic pigments include yellow pigments (such as C.I. Pigment Yellow 34, C.I. Pigment Yellow 37, C.I. Pigment Yellow 42, and C.I. Pigment Yellow 53), red pigments (such as C.I. Pigment Red 101 and C.I. Pigment Red 108), blue pigments (such as C.I. Pigment Blue 27, C.I. Pigment Blue 29, and C.I. Pigment Blue 17:1), black pigments (such as C.I. Pigment Black 7 and magnetite), and white pigments (such as C.I. Pigment White 4, C.I. Pigment White 6, C.I. Pigment White 18, and C.I. Pigment White 21).

As pigments having a color tone preferable for image formation, blue or cyan pigments such as phthalocyanine pigments, anthraquinone based indanthrone pigments (such as C.I. Pigment Blue 60), and dyeing lake pigment based triaryl carbonium pigments are preferable; and phthalocyanine pigments (preferred examples include copper phthalocyanines and monochloro or lowly chlorinated copper phthalocyanines such as C.I. Pigment Blue 15:1, C.I. Pigment Blue 15:2, C.I. Pigment Blue 15:3, C.I. Pigment Blue 15:4, and C.I. Pigment Blue 15:6, aluminum phthalocyanines such as pigments described in European Patent No. 860,475, a non-metal phthalocyanine as C.I. Pigment Blue 16, and phthalocyanines having Zn, Ni or Ti as a central metal; and of these pigments, C.I. Pigment Blue 15:3, C.I. Pigment Blue 15:4, and aluminum phthalocyanines are most preferable) are most preferable.

As red or violet pigments, azo pigments (preferred examples include C.I. Pigment Red 3, C.I. Pigment Red 5, C.I. Pigment Red 11, C.I. Pigment Red 22, C.I. Pigment Red 38, C.I. Pigment Red 48:1, C.I. Pigment Red 48:2, C.I. Pigment Red 48:3, C.I. Pigment Red 48:4, C.I. Pigment Red 49:1, C.I. Pigment Red 52:1, C.I. Pigment Red 53:1, C.I. Pigment Red 57:1, C.I. Pigment Red 63:2, C.I. Pigment Red 144, C.I. Pigment Red 146, and C.I. Pigment Red 184; and of these pigments, C.I. Pigment Red 57:1, C.I. Pigment Red 146, and C.I. Pigment Red 184 are most preferable), quinacridone based pigments (preferred examples C.I. Pigment Red 122, C.I. Pigment Red 192, C.I. Pigment Red 202, C.I. Pigment Red 207, C.I. Pigment Red 209, C.I. Pigment Violet 19, and C.I. Pigment Violet 42; and of these pigments, C.I. Pigment 122 is most preferable), dyeing lake based triaryl carbonium pigments (preferred examples of xanthene based C.I. Pigment Red 81:1, C.I. Pigment Violet 1, C.I. Pigment Violet 2, C.I. Pigment Violet 3, C.I. Pigment Violet 27, and C.I. Pigment Violet 39), dioxazine based pigments (such as C.I. Pigment Violet 23 and C.I. Pigment Violet 37), diketopyrogallol based pigments (such as C.I. Pigment Red 254), perylene pigments (such as C.I. Pigment Violet 29), anthraquinone based pigments (such as C.I. Pigment Violet 5:1, C.I. Pigment Violet 31, and C.I. Pigment Violet 33), and thioindigo based pigments (such as C.I. Pigment Red 38 and C.I. Pigment Red 88) are preferably used.

As yellow pigments, azo pigments (preferred examples include monoazo pigment based C.I. Pigment Yellow 1, C.I. Pigment Yellow 3, C.I. Pigment Yellow 74, and C.I Pigment Yellow 98, diazo pigment based C.I. Pigment Yellow 12, C.I. Pigment Yellow 13, C.I. Pigment Yellow 14, C.I. Pigment Yellow 16, C.I. Pigment Yellow 17, and C.I. Pigment Yellow 38, overall azo based C.I. Pigment Yellow 93, C.I. Pigment Yellow 94, C.I. Pigment Yellow 95, C.I. Pigment Yellow 128, and C.I. Pigment Yellow 155, and benzimidazolone based C.I. Pigment Yellow 120, C.I. Pigment Yellow 151, C.I. Pigment Yellow 154, C.I. Pigment Yellow 156, and C.I. Pigment Yellow 180; and of these pigments, those using a benzidine based compound as the raw material are most preferable), isoindoline.isoindolinone based pigments (preferred examples include C.I. Pigment Yellow 109, C.I. Pigment Yellow 110, C.I. Pigment Yellow 137, and C.I. Pigment Yellow 139), quinophthalone pigments (preferred examples include C.I. Pigment Yellow 138), and flavanthrone pigments (such as C.I. Pigment Yellow 24) are preferably used.

As black pigments, inorganic pigments (preferred examples include carbon black and magnetite) and Aniline Black can be enumerated as preferred examples.

Besides, orange pigments (such as C.I. Pigment Orange 13 and C.I. Pigment Orange 16) and green pigments (such as C.I. Pigment Green 7) may be used.

The pigments that can be used in the invention may be the above-described naked pigments or surface-treated pigments. As the surface treatment method, there can be considered a method of coating the surface with a resin or a wax, a method of adhering a surfactant, and a method of binding a reactive substance (such an radicals generated from silane coupling agents, epoxy compounds, polyisocyanates, or diazonium salts) to the pigment surface. These methods are described in the following literatures and patents.

(1) *Kinzoku Sekken No Seishitsu To Ohyo* (Properties and Applications of Metallic Soaps), published by Saiwai Shobo (2) *Insatsu Inki Gijutsu* (Printing Ink Technologies), published by CMC Publishing Co., Ltd. (1984)

(3) *Saishin Ganryo Ohyo Gijutsu* (Current Pigment Application Technologies), published by CMC Publishing Co., Ltd. (1986)

(4) U.S. Pat. Nos. 5,554,739 and 5,571,311

(5) JP-A-9-151342, JP-A-10-140065, JP-A-10-292143, and JP-A-11-166145

Especially, the self-dispersible pigments prepared by exerting a diazonium salt to carbon black as described in the U.S. patents of the foregoing item (4) and the capsulated pigments prepared by the methods described in the Japanese patents of the foregoing item (5) are effective because dispersion stability is obtained without using a superfluous dispersant in the ink.

In the invention, the pigment may be further dispersed using a dispersant. As the dispersant, various known dispersants such as low-molecular weight dispersants of a surfactant type and high-molecular weight type dispersants can be used depending upon the pigment. Examples of the dispersant include those described in JP-A-3-69949 and European Patent No. 549,486. Also, in using the dispersant, for the sake of promoting adsorption of the dispersant onto the pint, pigment derivatives called a synergist may be added.

The particle size of the pigment that can be used in the invention is preferably in the range of from 0.01 to 10 μm, and more preferably from 0.05 to 1 μm after dispersion.

As a method of dispersing the pigment, known dispersion technologies to be used at the time of ink production or toner production can be employed. Examples of dispersing machines include a vertical or horizontal agitator mill, an attritor, a colloidal mill, a ball mill, a three-roll mill, a pearl mill, a super mill, an impeller, a disperser, a KD mill, a dynatron, and a pressure kneader. The details are described in *Saishin Ganryo Ohyo Gijutsu* (Current Pigment Application Technologies), published by CMC Publishing co., Ltd. (1986).

Next, other components that can be contained in the inkjet recording ink (composition) of the invention will be hereunder described.

The inkjet recording ink composition of the invention can contain a surfactant. By adjusting liquid physical properties of the ink composition using the surfactant, it is possible to bring about excellent effects such as an improvement in discharge stability of the ink composition, an improvement in water resistance of images, and prevention of bleeding of the printed ink composition.

Examples of the surfactant include anionic surfactants (such as sodium dodecylsulfate, sodium dodecyloxysulfonate, and sodium alkylbenzenesulfonates), cationic surfactants (such as cetyl pyridinium chloride, trimethylcetylammonium chloride, and tetrabutylammonium chloride), and nonionic surfactants (such as polyoxyethylene nonylphenyl ether, polyoxyethylene naphthyl ether, and polyoxyethylene octylphenyl ether). Above all, nonionic surfactants are especially preferably used.

The content of the surfactant is from 0.001 to 15% by weight, preferably from 0.005 to 10% by weight, and more preferably from 0.01 to 5% by weight in the ink composition.

The inkjet recording ink of the invention can be prepared by dissolving and/or dispersing the dyes and the surfactant in an aqueous medium. In the invention, the "aqueous medium" means water or a mixture of water and a small amount of a water-miscible organic solvent, to which are optionally added additives such as a wetting agent, a stabilizer, and an antiseptic agent.

Examples of water-miscible organic solvents (including water-soluble organic solvents) that can be used in the invention include alcohols (such as methanol, ethanol, propanol, isopropanol, butanol, isobutanol, sec-butanol, t-butanol, pentanol, hexanol, cyclohexanol, and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (such as ethylene glycol monomethyl ether, ethylene glycol monoethyl ether, ethylene glycol monobutyl ether, diethylene glycol monamethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (such as ethanolamine, diethanol-amine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamin), and other polar solvents (such as formamide, N,N-dimethylformamide, N,N-dimethylacetamide, dimethyl sulfoxide, sulforane, 2-pyrrolidone, N-methyl-yl-2-pyrrolidone, N-vinyl-2-pyrrolidone, 2-oxazolidone, 1,3-dimethyl-2-imidazolidinone, acetonitrile, and acetone). Incidentally, the water-miscible organic solvent may be used in admixture of two or more thereof. In the invention, of these organic solvents, water-soluble organic solvents having a boiling point of 150° C. or higher are preferably used.

In the case where the dye is an oil-soluble dye, the ink can be prepared by dissolving the oil-soluble dye in a high-boiling organic solvent and emulsifying and dispersing it in the aqueous medium.

The high-boiling organic solvent that is used in the invention has a boiling point of 150° C. or higher, and preferably 170° C. or higher.

Examples include phthalic acid esters (such as dibutyl phthalate, dioctyl phthalate, dicyclohexyl phthalate, di-2-ethylhexyl phthalate, decyl phthalate, bis-(2,4-di-tert-amylphenyl) isophthalate, and bis(1,1-di-ethylpropyl)phthalate), phosphoric acid or phosphonic acid esters (such as diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, and di-2-ethylhexylphenyl phosphate), benzoic acid esters (such as 2-ethylhexyl benzoate, 2,4-dichlorobenz ate, dodecyl benzoate, 2-ethylhexyl-p-hydroxybenzoate), amides (such as N,N-diethyl dodecanamide and N,N-diethyl laurylamide), alcohols or phenols (such as isostearyl alcohol and 2,4-di-tert-amylphenol), fatty acid esters (such as dibutoxyethyl succinate, di-2-ethylhexyl succinate, 2-hexyldecyl tetradecanoate, tributyl citrate, diethyl azelate, isostearyl lactate, and trioctyl citrate), aniline derivatives (such as N,N-dibutyl-2-butoxy-5-text-octylaniline), chlorinated paraffins (such as paraffins having a chlorine content of from 10% to 80%), trimesic acid esters (such as tributyl trimesate), dodecylbenzene, diisopropylnaphthalene, phenols (such as 2,4-di-tert-amylphenol, 4-dodecyloxyphenol, 4-dodecyloxycarbonylphenol, and 4-(4-dodecyloxyphenylsulfonyl)phenol), carboxylic acids (such as 2-(2,4-di-tert-amylphenoxybutyric acid and 2-ethoxyoctanedecanoic acid), and alkylphosphoric acids (such as di-2-(ethylhexyl)phosphoric acid and diphenylphosphoric acid). The high-boiling organic solvent can be used in an amount of from 0.01 to 3 times, and preferably from 0.01 to 1.0 times the weight of the oil-soluble dye.

The high-boiling organic solvent may be used singly or in admixture (such as tricresyl phosphate and dibutyl phthalate, trioctyl phosphate and di(2-ethylhexyl) sebacate, and dibutyl phthalate and poly(N-t-butylacrylamide)).

Compounds other than the foregoing high-boiling organic solvents that are used in the invention and/or synthesis methods of these high-boiling organic solvents are described in, for example, U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, and 5,013,639, European Patent Nos. 276,319A, 286,253A, 289,820A, 309,158A, 309,159A, 309,160A, 509,311A, and 510,57A, East German Patent Nos. 147,009, 157,147, 159,573, and 225,240A, British Patent No. 2,091,124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946, and JP-A-4-346338.

The high-boiling organic solvent can be used in an amount of from 0.01 to 3 times, and preferably from 0.01 to 1.0 times the weight of the oil-soluble dye.

In the invention, the oil-soluble dye and the high-boiling organic solvent are emulsified and dispersed in the aqueous medium and then used. In emulsification and dispersion, a low-boiling organic solvent can be optionally used from the viewpoint of emulsification properties. The low-boiling organic solvent is an organic solvent having a boiling point of from about 30° C. to 150° C. at atmospheric pressure. For example, esters (such as ethyl acetate, butyl acetate, ethyl propionate, β-ethoxyethyl acetate, and methyl cellosolve acetate), alcohols (such as isopropyl alcohol, n-butyl alcohol, and sec-butyl alcohol), ketones (such as methyl isobutyl ketone, methyl ethyl ketone, and cyclohexanone), amides (such as dimethylformamide and N-methylpyrrolidone), and ethers (such as tetrahydrofuran and dioxane) are preferably used. However, it should not be construed that the invention is limited thereto.

The emulsification and dispersion are carried out for the sake of dissolving the dye in the high-boiling organic solvent or a mixed solvent of the high-boiling organic solvent and the low-boiling organic solvent as the case may be, and dispersing the resulting oil phase in an aqueous phase composed mainly of water to prepare fine oil droplets of the oil phase. During this operation, if desired, additives such as surfactants, wetting agents, dye stabilizers, emulsification stabilizers, antiseptic agents, and antifungal agents as described later can be added to either one or both of the aqueous phase and the oil phase.

As the emulsification method, a method of adding the oil phase into the aqueous phase is general, but a so-called phase inversion emulsification method in which the aqueous phase is dropped into the oil phase can also be preferably used.

In the invention, in the emulsification and dispersion, various surfactants can be used. For example, anionic surfactants (such as fatty acid salts, alkylsulfuric acid ester salts, alkylbenzenesulfonic acid salts, alkylnaphthalenesulfonic acid salts, dialkylsulfosuccinic acid salts, alkylphosphoric acid ester salts, naphthalenesulfonic acid-formalin condensates, and polyoxyethylene alkylsulfuric acid esters salts) and nonionic surfactants (such as polyoxyethylene alkyl ethers, polyoxyethylene alkylaryl ethers, polyoxyethylene fatty acid esters, sorbitan fatty acid esters, polyoxyethylene sorbitan fatty acid esters, polyoxyethylene alkylamines, glycerin fatty acid esters, and oxyethyleneoxypropylene block copolymers) are preferable. Also, SURFYNOLS (manufactured by Air Products & Chemicals) that is an acetylene based polyoxyethylene oxide surfactant is preferably used. Also, amine oxide type ampholytic surfactants such as N,N-dimethyl-N-alkylamin oxides are preferable. Further, surfactants described on pages 37 to 38 of JP-A-59-157636 and in *Research Disclosure* No. 308119 (1989) can be used.

Also, for the purpose of striving for stabilization after the emulsification, a water-soluble polymer can be added in combination with the foregoing surfactant. As the water-soluble polymer, for example, polyvinyl alcohol, polyvinylpyrrolidone, polyethylene oxide, polyacrylic acid, polyacrylamide, and copolymers thereof are preferably used. Also, it is also preferable to use natural water-soluble polymers such as polysaccharides, casein, and gelatin. Further, for the sake of stabilizing the dye dispersion, it is possible to jointly use polyvinyl compounds, polyurethanes, polyesters, polyamides, polyureas, polycarbonates, etc. that are substantially insoluble in the aqueous medium and which are obtained by polymerization of acrylic acid esters, methacrylic acid esters, vinyl esters, acrylamides, methacrylamides, olefins, styrenes, vinyl ethers, or acrylonitriles. It is preferable that these polymers contain —$SO_3^-$ or —$COO^-$. In the case where the polymer that is substantially insoluble in the aqueous medium is used together, it is preferable to use the high-boiling organic solvent in an amount of not more than 20% by weight, and more preferably not more than 10% by weight.

In the case where the aqueous ink composition is formed by dispersing the oil-soluble dye or the high-boiling organic solvent by emulsification and dispersion, it is especially important to control the particle size thereof. In forming an image by inkjet, it is essential to make the mean particle size small for the sake of enhancing the color purity or density. The volume mean particle size is preferably not more than 1 μm, and more preferably from 5 to 100 nm.

The volume mean particle size and particle size distribution of the dispersed particles can be easily measured according to known methods such as the static light scattering method, the dynamic light scattering method, the centrifugal sedimentation method, and the methods described on pages 417 to 418 of *Jikken Kagaku Koza* (Lectures on Experimental Chemistry), $4^{th}$ Edition. For example, the particle size can be easily measured by commercially available volume mean particle size analyzers (such as Microtrac UPA (manufactured by Nikkiso Co., Ltd.) upon dilution with distilled water such that the particle concentration in the ink composition is from 0.1 to 1% by weight. Further, the dynamic light scattering method utilizing the laser Doppler effect is especially preferable because the particle size to small sizes can be measured.

The volume mean particle size means a mean particle size weighed by the particle volume and is a value obtained by dividing the sum of ones obtained by multiplying the diameter of the individual partical by the volume of the particle by the total volume of the particles in aggregation of the particles. The volume mean particle size is described on page 119 of *Kobunshi Ratekkusu No Kagaku* (Chemistry of Synthetic Latices) (written by Soichi Muroi and published by Kobunshi Kankokai).

Also, it has become clear that the presence of coarse particles plays a very important role in the printing performance. That is, it has been noted that the coarse particles clog a head nozzle or do not clog the head nozzle but form stains to cause inferior discharge or slippage in discharge of the ink, thereby seriously influencing the printing performance. For the sake of preventing such a phenomenon, when formed into an ink, it is important to suppress the number of particles of 5 μm or larger to not more than 10 and the number of particles of 1 μm or larger to not more than 100, respectively in 1 μL of the ink.

As a method of removing these coarse particles, known methods such as the centrifugal separation process and the microfiltration process can be employed. These separation, measures may be carried out immediately after emulsification and dispersion, or after adding various additives such as wetting agents and surfactants to the emulsified dispersion and immediately before filling in an ink cartridge.

As an effective measure of making the mean particle size small and making the coarse particles free, it is possible to use a mechanical emulsification device.

As the emulsification device, known devices such as a simple stirrer or impeller stirring mode, an in-line stirring mode, a mill mode using a colloid mill, etc., and an ultrasonic mode can be employed, but use of a high-pressure homogenizer is especially preferable.

The detailed mechanism of the high-pressure homogenizer is described in, for example, U.S. Pat. No. 4,533,254 and JP-A-6-47264. Examples of commercially available devices include Gaulin Homogenizer (manufactured by A. P. V GAULIN INC.), Microfluidizer (manufactured by MICROFLUIDEX INC.), and Ulthimaizer (manufactured by SUGINO MACHINE LIMITED).

Also, in recent years, a high-pressure homogenizer provided with a mechanism of atomization in an ultrahigh pressure jet flow as described in U.S. Pat. No. 5,720,551 is especially preferable for the emulsification and dispersion of the invention. Examples of the emulsification device using an ultrahigh pressure jet flow include DeBEE 2000 (manufactured by BEE INTERNATIONAL LTD.).

In emulsification using a high-pressure emulsification and dispersion device, the pressure is 50 MPa or more, preferably 60 MPa or more, and more preferably 190 MPa or more.

For example, a method of using two kinds or more emulsification devices together, in which after emulsification by a stirring and emulsification machine, the emulsion is passed through a high-pressure homogenizer, is especially preferable. Also, a method in which after once undergoing emulsification and dispersion using these emulsification devices, additives such as wetting agents and surfactants are added, and the ink is again passed through a high-pressure homogenizer during filling it in a cartridge is also preferable.

In the case where a low-boiling organic solvent is contained in addition to the high-boiling organic solvent, it is preferable to remove the low-boiling organic solvent from the viewpoints of stability and safety and hygiene of the emulsion. As a method of removing the low-boiling organic solvent, various known methods can be used depending upon the kind of the solvent. That is, examples include the evaporation process, the vacuum evaporation process, and the ultrafiltration process. It is preferable to carry out the removal step of the low-boiling organic solvent as quick as possible immediately after the emulsification.

For the inkjet recording ink composition obtained in the invention, additives such as an antidrying agent for preventing clogging due to drying of the ink in an injection port, a penetration accelerator for accelerating penetration of the ink into paper, a UV absorber, an antioxidant, a viscosity modifier, a surface tension modifier, a dispersant, a dispersion stabilizer, an antifungal agent, a rust preventive, a pH adjuster, an antifoaming agent, and a chelating agent can be properly chosen and used in proper amounts.

As the antidrying agent, water-soluble organic solvents having a vapor pressure lower than water are preferable. Specific examples include polyhydric alcohols (represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane), lower alkyl ethers of polyhydric alcohols (such as ethylene glycol monomethyl (or monoethyl) ether, diethylene glycol monomethyl (or monoethyl) ether, and triethylene glycol monoethyl (or monobutyl) ether), heterocyclic compounds (such as 2-pyrrolidone, N-methyl-2-pyrrolidone, 1,3-dimethyl-2-imidazolidinone, and N-ethylmorpholine), sulfur-containing compounds (such as sulforane, dimethyl sulfoxide, and 3-sulfolene), polyfunctional compounds (such as diacetone alcohol and diethanolamine), and urea derivatives. Of these compounds, polyhydric alcohols such as glycerin and diethylene glycol are more preferable. Also, the antidrying agent may be used singly or in admixture of two or more thereof. It is preferable that the antidrying agent is contained in an amount of from 10 to 50% by weight in the ink.

As the penetration accelerator, alcohols (such as ethanol, isopropanol, butanol, di(or tri)ethylene glycol monobutyl ether, and 1,2-hexanediol) and nonionic surfactants (such as sodium lauryl sulfate and sodium oleate) can be used. When the penetration accelerator is contained in an amount of from 10 to 30% by weight in the ink, there gives rise to a sufficient effect. It is preferable to use the penetration accelerator in the addition amount within the range where bleeding of printing and print-through are not caused.

In the invention, as the UV absorber that can be used for the sake of improving preservability of the image, benzotriazole based compounds described in JP-A-58-185677, JP-A-61-190537, JP-A-2-782, JP-A-5-197075, and JP-A-9-34057; benzophenone based compounds described in JP-A-46-2784, JP-A-5-194483, and U.S. Pat. No. 3,214,463; cinnamic acid based compounds JP-B-48-30492, JP-B-56-21141, and JP-A-10-88106; triazine based compounds described in JP-A-4-298503, JP-A-8-53427, JP-A-8-239368, JP-A-10-182621, and JP-T-8-501291; compounds described in *Research Disclosure* No. 24239; and compounds of absorbing UV rays to emit fluorescence, which are a so-called fluorescent brightener, represented by stilbene based compounds and benzoxazole based compounds can be used.

In the invention, as the antioxidant that can be used for the sake of improving preservability of the image, various organic based or metal complex based antifading agents can be used. Examples of organic antifading agents include hydroquinones, alkoxyphenols, dialkoxyphenols, phenols, anilines, amines, indanes, chromans, alkoxyanilines, and heterocyclic compounds. Examples of metal complexes include nickel complexes and zinc complexes. More specifically, compounds described in the patents cited in *Research Disclosure* No. 17643, No. VII, Items I to J, ibid. No. 15162, ibid. No. 18716, page 650, left columns, ibid. No. 36544, page 527, ibid. No. 307105, page 872, and ibid. No. 15162 and the formulae of representative examples and illustrative compounds described on pages 127 to 137 of JP-A-62-215272 can be used.

Examples of the antifungal agent that can be used in the invention include sodium dehydroacetate, sodium benzoate, sodium pyridinethione-1-oxide, ethyl p-hydroxybenzoate, and 1,2-benzisothiazolin-3-one and salts thereof. It is preferable that the antifungal agent is used in an amount of from 0.02 to 5.00% by weight in the ink.

Incidentally, the details are described in, for example, *Bokin-Bobaizai Jiten* (Encyclopedia of Antibacterial and Antifungal Agents) (edited by The Society for Antibacterial and Antifungal Agents, Japan, Encyclopedia Editorial Committee).

Also, examples of the rust preventive include acidic sulfites, sodium thiosulfate, thioglycolic acid ammon, diisopropylamonium nitrite, pentaerythritol tetranitrate, dicyclohexylammonium nitrite, and benzotriazole. It is preferable that the rust preventive is contained in an amount of from 0.02 to 5.00% by weight in the ink.

The pH adjuster that can be used in the invention can be suitably used from the standpoints of pH adjustment, impartation of dispersion stability, etc., and it is preferable that the ink is adjusted at a pH of from 8 to 11 at 25° C. In the case where the pH is less than 8, the solubility of the dye is lowered so that the nozzle is clogged, whereas when the pH exceeds 11, water resistance is liable to be deteriorated. As the pH adjuster, the basic pH adjuster includes organic bases and inorganic alkalis, and the acidic pH adjuster includes organic acids and inorganic acids.

Examples of organic bases include triethanolamine, dietahnolamine, N-methyldiethanolamine, and dimethylethanolamine. Examples of inorganic alkalis include alkali metal hydroxides (such as sodium hydroxide, lithium hydroxide, and potassium hydroxide), carbonates (such as sodium carbonate and sodium bicarbonate), and ammonia. Examples of organic acids include acetic acid, propionic acid, trifluoroacetic acid, and alkylsulfonic acids. Examples of inorganic acids include hydrochloric acid, sulfuric acid, and phosphoric acid.

Separately from the foregoing surfactants, nonionic cationic or anionic surfactants can be enumerated as the surface tension modifier. Examples of anionic surfactants include fatty acid salts, alkylsulfuric acid ester salts, alkylbenzenesulfonic acid salts, alkylnaphthalenesulfonic acid salts, dialkylsulfosuccinic acid salts, alkylphosophoric acid ester salts, naphthalenesulfonic acid-formalin condensates, and polyoxyethylene alkylsulfuric acid esters salts. Examples of nonionic surfactants include polyoxyethylene alkyl ethers, polyoxyethylene alkylaryl ethers, polyoxyethylene fatty acid esters, sorbitan fatty acid esters, polyoxyethylene sorbitan fatty acid esters, polyoxyethylene alkylamines, glycerin fatty acid esters, and oxyethylene-oxypropylene block copolymers. Also, SURFYNOLS (manufactured by Air Products & Chemicals) that is an acetylene based polyoxyethylene oxide surfactant is preferably used. Also, amine oxide type ampholytic surfactants such as N,N-dimethyl-N-alkylamine oxides are preferable. Further, surfactants described on pages 37 to 38 of JP-A-59-157636 and in Research Disclosure No. 308119 (1989) can be used as the surfactant.

The surface tension of the ink that is used in the invention is preferably from 20 to 50 mN/m, and more preferably from 20 to 40 mN/m at 25° C. in terms of any of dynamic or static surface tension. When the surface tension exceeds 50 mN/m, discharge stability is extremely deteriorated, and bleeding at the time of color mixing and whisker are caused, leading to marked reduction in printing quality. On the other hand, when the surface tension is less than 20 mN/m, inferior printing due to adhesion of the ink to the hard surface at the time of discharge may possibly occur.

The ink of the invention preferably has a viscosity of from 1 to 20 mPa·s, more preferably from 2 to 15 mPa·s, and especially preferably 2 to 10 mPa·s, at 25° C. When the viscosity of the ink exceeds 30 mPa·s, the fixing rate of the recorded image becomes slow, and the discharge performance is lowered. On the other hand, when it is less than 1 mPa·s, the recorded image causes bleeding so that the quality is lowered.

The viscosity can be arbitrarily adjusted by the addition amount of the ink solvent. Examples of the ink solvent include glycerin, diethylene glycol, triethanolamine, 2-pyrrolidone, diethylene glycol monobutyl ether, and triethylene glycol monobutyl ether.

Also, a viscosity modifier may be used. Examples of the viscosity modifier include celluloses, water-soluble polymers such as polyvinyl alcohol, and nonionic surfactants. Further, the details are described in *Nendo Chosei Gijutsu* (Viscosity Adjustment Technologies), Chapter 9, (by Gijutsu Joho Kyokai, 1999) and Chemicals for Inkjet Printer ('98 Enlarged Edition)—Prospects and Surveys of Development of Materials—(by CMC Publishing co., Ltd., 1997), pages 162 to 174.

Also, in the invention, the foregoing various cationic, anionic or nonionic surfactants can be used as the dispersant and dispersion stabilizer, and fluorine based or silicone based compounds and chelating agents represented by EDTA can be used as the antifoaming agent as the need arises.

In preparing the ink of the invention, in the case of an aqueous ink, it is preferable to first dissolve the dye in water. Thereafter, various solvents and additives are added, and the mixture is dissolved and mixed to form a uniform ink.

At this time, as the dissolution method, various methods such as dissolution by stirring, dissolution by ultrasonic irradiation, and dissolution by vibration can be used. Of these methods, the stirring method is preferably used. In the case of undergoing stirring, various modes that are known in the art, such as fluidized agitation and agitation utilizing a shear force using an inverse agitator or a dissolver can be utilized. On the other hand, a stirring method utilizing a shear force against the container bottom by a magnetic stirrer, etc. can be suitably utilized.

Recording paper and recording films as a reflection medium to be used in the image recording method of the invention will be hereunder described. A support in the recording paper and recording film is made of a chemical pulp (such as LBKP and NBKP), a mechanical pulp (such as GP, PGW, RMP, TMP, CTMP, CMP, and CGP), a used paper pulp (such as DIP) etc. If desired, the pulp is mixed with conventionally known additives such as pigments, binders, sizing agents, fixing agents, cationic agents, and paper strength additives, and the mixture is processed by various devices such as a fourdrinier paper machines and cylinder paper machines. The thus produced support can be used. In addition to these supports, synthetic paper and plastic film sheets can be used. It is desired that the support has a thickness of from 10 to 250 μm and a basis weight of from 10 to 250 g/m².

An image receiving material may be prepared by providing an ink absorbing layer and a backcoat layer on the support as it is. Also, an image receiving material may be prepared by size pressing with starch, polyvinyl alcohol, etc. or providing an anchor coating layer, and then providing an ink absorbing layer and a backcoat layer. Further, the support may be subjected to flattening processing by a calendering device such as a machine calender, a TG calender, and a soft calender.

In the invention, as the support, paper and plastic films, the both sides of which are laminated with a polyolefin (such as polyethylene, polystyrene, polyethylene terephthalate, polybutene, and copolymers thereof) are preferably used. It is preferable to add a white pigment (such as titanium oxide and zinc oxide) or a coloring dye (such as cobalt blue, ultramarine, and neodymium oxide) to the polyolefin.

The ink absorbing layer to be provided on the support contains a porous material and an aqueous binder. Also, it is preferable that the ink absorbing layer contains a pigment. As the pigment, a white pigment is preferable. Examples of white pigments include inorganic white pigments (such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate) and organic pigments (such as styrene based pigments, acrylic pigments, urea resins, and melamine resins). Of these pigments, porous white inorganic pigments are preferable, and synthetic amorphous silica having a large pore area is especially suitable. As the synthetic amorphous silica, any of an anhydrous silicate obtained by the dry production process and a hydrated silicate obtained by the wet production process can be used, but it is especially desired to use the hydrated silicate. These pigments may be used in admixture of two or more thereof.

Examples of the aqueous binder to be contained in the ink absorbing layer include water-soluble polymers (such as polyvinyl alcohol, silanol-modified polyvinyl alcohol, starch, cationic starch, casein, gelatin, carboxymethyl cellulose, hydroxyethyl cellulose, polyvinylpyrrolidone, polyalkylene oxides, and polyalkylene oxide derivatives) and water-dispersible polymers (such as styrene butadiene latices and acrylic emulsions). The aqueous binder can be used singly or in admixture of two or more thereof. In the invention, of these aqueous binders, polyvinyl alcohol and silanol-modified polyvinyl alcohol are especially suitable from the standpoints of adhesion to the pigment and resistance to peeling of the ink absorbing layer.

The ink absorbing layer can contain mordants, waterproofing agents, light fastness enhancers, surfactants, hardeners, and other additives in addition to the pigment and aqueous binder.

It is preferable that the mordant to be added in the ink absorbing layer is immobilized. For this purpose, polymer mordants are preferably used.

The polymer mordants are described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, and U.S. Pat. Nos. 2,484,430, 2,548,564, 3,148,061, 3,309,690, 4,115,124, 4,124,386, 4,193,800, 4,273,853, 4,282,305, and 4,450,224. Image receiving materials containing polymer mordants described on pages 212 to 215 of JP-A-1-161236 are especially preferable. When the polymer mordants described in this patent are used, images having excellent image quality are obtained, and light fastness of images are improved.

The waterproofing agent is effective for making the image waterproof, and cationic resins are especially desired as the waterproofing agent. Examples of cationic resins include polyamide polyamine epichlorohydrin, polyethyleneimine, polyaminesulfone, dimethyldiallylammonium chloride polymers, cationic polyacrylamide, and colloidal silica. Of these cationic resins, polyamide polyamine epichlorohydrin is suitable. The content of the cationic resin is preferably from 1 to 15% by weight, and especially preferably from 3 to 10% by weight based on the whole of the solid contents of the ink absorbing layer.

Examples of the light fastness enhancer include zinc sulfate, zinc oxide, hindered amine based antioxidants, and benzotriazole based UV absorbers such as benzophenone. Of these light fastness enhancers, zinc sulfate is especially suitable.

The surfactant functions as a coating aid, a peeling improver, a slipperiness improver, or an antistatic agent. The surfactant is described in JP-A-62-173463 and JP-A-62-183457.

Organic fluoro compounds may be used in place of the surfactant. It is preferable that the organic fluoro compounds are hydrophobic. Examples of the organic fluoro compounds include fluorine based surfactants, oily fluorine based compounds (such as fluorocarbon oils), and solid fluorine based compounds (such as tetrafluoroethylene resins). The organic fluoro compounds are described in JP-B-57-9053 (columns 8 to 17), JP-A-61-20994, and JP-A-62-135826.

As the hardener, materials described on page 222 of JP-A-1-161236 can be used.

Examples of other additives that are added in the ink absorbing layer include pigment dispersants, thickeners, antifoaming agents, dyes, fluorescent brighteners, antiseptic agents, pH adjusters, matting agents, and hardeners. Incidentally, the ink absorbing layer may be of a single layer structure or a double-layer structure.

The recording paper and recording film can be provided with a backcoat layer. As components that can be added to this backcoat layer, white pigments, aqueous binders, and other components can be enumerated.

Examples of white pigments that are contained in the backcoat layer include white inorganic pigments (such as precipitated calcium carbonate light, calcium carbonate heavy, kaolin, talc, calcium sulfate, barium sulfate, titanium dioxide, zinc oxide, zinc sulfide, zinc carbonate, satin white, alumina silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrated halloysite, magnesium carbonate, and magnesium hydroxide) and organic pigments (such as styrene based plastic pigments, acrylic plastic pigments, polyethylene, microcapsules, urea resins, and melamine resins).

Examples of aqueous binders that are contained in the backcoat layer include water-soluble polymers (such as styrene/maleic acid salt copolymers, styrene/acrylic acid salt copolymers, polyvinyl alcohol, silanol-modified polyvinyl alcohol, starch, cationic starch, casein, gelatin, carboxymethyl cellulose, hydroxyethyl cellulose, and polyvinylpyrrolidone) and water-dispersible polymers (such as styrene butadiene latices and acrylic emulsions). Examples of other components that are contained in the backcoat layer include antifoaming agents, foam inhibitors, dyes, fluorescent brighteners, antiseptic agents, and waterproofing agents.

A polymer fine particle dispersion may be added to the constitutional layers (including the backcoat layer) of the inkjet recording paper and recording film. The polymer fine particle dispersion is used for the purpose of improving the film physical properties such as dimensional stabilization, curling prevention, adhesion prevention, and film crack prevention. The polymer fine particle dispersion is described in JP-A-62-245258, JP-A-62-136648, and JP-A-62-110066. When a polymer fine particle dispersion having a low glass transition temperature (not higher than 40° C.) is added to the mordant-containing layer, it is possible to prevent crack and curling of the layer from occurrence. Also, when a polymer fine particle dispersion having a high glass transition temperature is added to the backcoat layer, it is also possible to prevent curling of the layer from occurrence.

In the invention, the inkjet recording mode is not limited but can be applied to known modes such as a charge control mode of discharging the ink utilizing an electrostatic induction force, a drop-on-demand mode (a pressure pulse mode) utilizing a vibration pressure of piezoelectric element, an acoustic inkjet mode of converting electric signals to acoustic beams, irradiating the ink with the beams, and discharging the ink utilizing radiation pressure, and a thermal inkjet (bubble jet) mode of heating the ink to form bubbles and utilizing the generated pressure.

The inkjet recording mode includes a mode of injecting a number of inks having a low concentration called photo-inks in a small area, a mode of using a plurality of inks having substantially the same hue and having a different concentration to improve the image quality, and a mode of using a colorless transparent ink.

The inkjet recording ink of the invention can be used for other applications than the inkjet recording. For example, it can be used for materials for display image, image forming materials of interior-decoration materials, and image forming materials of outdoor decoration materials.

The materials for display image include posters, wallpaper, decorative small articles (such as ornaments and dolls), commercial advertising leaflets, packing paper, wrapping materials, paper bags, polyvinyl bags, packaging materials, signboards, pictures drawn in the side surfaces of transports (such as automobiles, buses, and electric trains) or images attached thereto, and logotype-provided dresses. In the case where the dye of the invention is a display image forming material, the term "image" as referred to herein includes not only images in the narrow sense but also all of patterns by dyes that a person can acknowledge, such as abstract designs, letters, and geometric patterns.

The interior decoration materials include wallpaper, decorative small articles (such as ornaments and dolls), members of lighting equipment, members of furniture, and design members of floor and ceiling. In the case where the dye of the invention is an image forming material, the term "image" as referred to herein includes not only images in the narrow sense but also all of patterns by dyes that a person can acknowledge, such as abstract designs, letters, and geometric patterns.

The outdoor decoration materials include wall materials, roofing materials, signboards, gardening materials, outdoor decorative small articles (such as ornaments and dolls), and members of outdoor lightening equipment. In the case where the dye of the invention is an image forming material, the term "image" as referred to herein includes not only images in the narrow sense but also all of patterns by dyes that a person can acknowledge, such as abstract designs, letters, and geometric patterns.

In the foregoing applications, examples of media on which patterns are formed include various materials such as paper, fabrics, cloths (including non-woven fabrics), plastics, metals, an ceramics. With respect to the dyeing mode, the pigment can be fixed by mordanting or textile printing, or in the form of a reactive dye having a reactive group introduced thereinto. Above all, it is preferable to undergo dyeing in the mordanting state.

EXAMPLES

The invention will be described with reference to the following Examples, but it should not be construed that the invention is limited thereto.

Example 1

Extrapure water (resistance: 18 MΩ or more) was added to the following components to make one liter, and the mixture was stirred for one hour while heating at from 30 to 40° C. Thereafter, the reaction mixture was filtered in vacuo by a microfilter having a mean pore size of 0.25 μm to prepare a yellow ink solution Y-101.

| [Formulation of yellow ink Y-101] | |
|---|---|
| (Solid components) | |
| Yellow dye (YI-58) of the invention: | 35 g/l |
| Proxel: | 5 g/l |
| Urea: | 10 g/l |
| (Liquid components) | |
| Triethylene glycol monobutyl ether (TGB): | 100 g/l |
| Glycerin (GR): | 115 g/l |
| Diethylene glycol (DEG): | 70 g/l |
| 2-Pyrrolidone: | 35 g/l |
| Triethanolamine (TEA): | 8 g/l |
| Surfynol STG (SW): | 10 g/l |

Further, a black dye was added to the foregoing formulation to prepare a dark yellow ink solution DY-101.

| [Formulation of dark yellow ink DY-101] | |
|---|---|
| (Solid components) | |
| Yellow dye (YI-58) of the invention: | 35 g/l |
| Black dye (BL-1): | 2 g/l |
| Proxel: | 5 g/l |
| Urea: | 10 g/l |
| (Liquid components) | |
| Triethylene glycol monobutyl ether (TGB): | 100 g/l |
| Glycerin (GR): | 115 g/l |
| Diethylene glycol (DEG): | 70 g/l |
| 2-Pyrrolidone: | 35 g/l |
| Triethanolamine (TEA): | 8 g/l |
| Surfynol STG (SW): | 10 g/l |

In contrast to these inks, yellow inks and dark yellow inks as comparative dyes were prepared in the same formulation as in Y-101 or DY-101, except for using the following two kinds of yellow dyes, black dye X, and other dyes of the invention.

1) The oxidation potential of the yellow dye (YI-58) as used herein was 1.0 V (vs SCE) or more in any measurement method of the dropping mercury electrode method, the cyclic voltammetry (CV) method, or the rotating ring disk electrode method using a 1 mmole/L aqueous solution of the dye. The oxidation potentials of the three yellow dyes (YI-59, YI-51 and YI-26) measured by the above-described CV method ranged from 1.03 to 1.05. Yellow Dyes (C) and (D) each have an oxidation potential below 1.0 volt (vs SCE).

The oxidation potentials of BL-1, BL-2 and Dye X obtained by similar measurements were 1.28, 1.30 and 0.71, respectively.

2) As regards the values of I(λmax+70 nm)/I(λmax) [absorbance ratio] for the yellow dyes used here, Yellow Dye (D) exhibited a value larger than 0.4, and Yellow Dye (C) less than 0.4. The [absorbance ratios] of the other dyes are shown in the parentheses below.

YI-58 (0.10), YI-59 (0.11), YI-51 (0.098), and YI-26 (0.10).

3) The accelerated fading rate constants for the yellow dyes are shown below.
YI-58: 0.00085
YI-59: 0.00097
YI-26: 0.00092
Yellow Dye (C): 0.072
Yellow Dye (D): 0.095

As the references for ink comparison, the yellow ink cartridge and the dark yellow ink cartridge for PM-950C of Seiko Epson Corp. were adopted.

The combinations of the dyes described heretofore are shown in the following table.

TABLE 7

| No. | Yellow dye | Dye mixed in dark yellow ink |
|---|---|---|
| PM-950C (Y, DY) (Comparison) | — | — |
| Y-101, DY-101 (Invention) | YI-58 | BL-1 |
| Y-102, DY-102 (Comparison) | C | BL-1 |
| Y-103, DY-103 (Comparison) | D | BL-1 |
| Y-104, DY-104 (Comparison) | YI-59 | X |
| Y-105, DY-105 (Invention) | YI-59 | BL-1 |
| Y-106, DY-106 (Invention) | YI-26 | BL-2 |
| Y-107, DY-107 (Invention) | YI-51 | BL-1 |

These inks were filled in the yellow ink and dark yellow ink cartridges of an inkjet printer PM-950C manufactured by Seiko Epson Corporation, and the inks of PM-950C were used as other color inks. Monochromic yellow image patterns and gray image patterns whose concentration changed stepwise were printed. Separately, the color tone of the image was visually evaluated using a test image chart of ISO/JIS 12640. The image was printed on inkjet paper photo glossy paper "Gasai" manufactured by Fuji Photo Film Co., Ltd. as an image receiving sheet, there evaluating the image quality, discharge properties of the ink, and image fastness.

(Evaluation Experiments)

With respect to the evaluation of the image preservability, five samples of a portrait image were prepared and evaluated in the following manner.

(1) With respect to the light fastness, an image was irradiated with xenon light (95,000 lux) for 7 days using an Atlas weatherometer and compared with a sample preserved in a dark room. As a result, the sample where a large failure was found as the image was defined as "A"; the sample where the portrait image was vigorously deteriorated was defined as "B"; and the sample where an entire failure was found as the image was defined as "C", respectively.

(2) With respect to the heat fastness, the sample was preserved at 80° C. and at 70% RH for 10 days and evaluated in the same manner as described above.

(3) With respect to the ozone resistance, the photo glossy paper having an image formed thereon was allowed to stand in a box set up at an ozone gas concentration of 0.5 ppm for 7 days and evaluated in the same manner as described above. The ozone gas concentration in the box was set up using an APPLICS ozone gas monitor (Model: OZG-EM-01).

The results obtained are shown in the following table.

TABLE 8

| No. | Light fastness | Heat fastness | O$_3$ Fastness |
| --- | --- | --- | --- |
| PM-950C (Y, DY) (Comparison) | B | B | C |
| Y-101, DY-101 (Invention) | A | A | A |
| Y-102, DY-102 (Comparison) | C | B | C |
| Y-103, DY-103 (Comparison) | C | B | C |
| Y-104, DY-104 (Comparison) | B | A | C |
| Y-105, DY-105 (Invention) | A | A | A |
| Y-106, DY-106 (Invention) | A | A | A |
| Y-107, DY-107 (Invention) | A | A | A |

Chemical formulae of the used dyes are shown below.

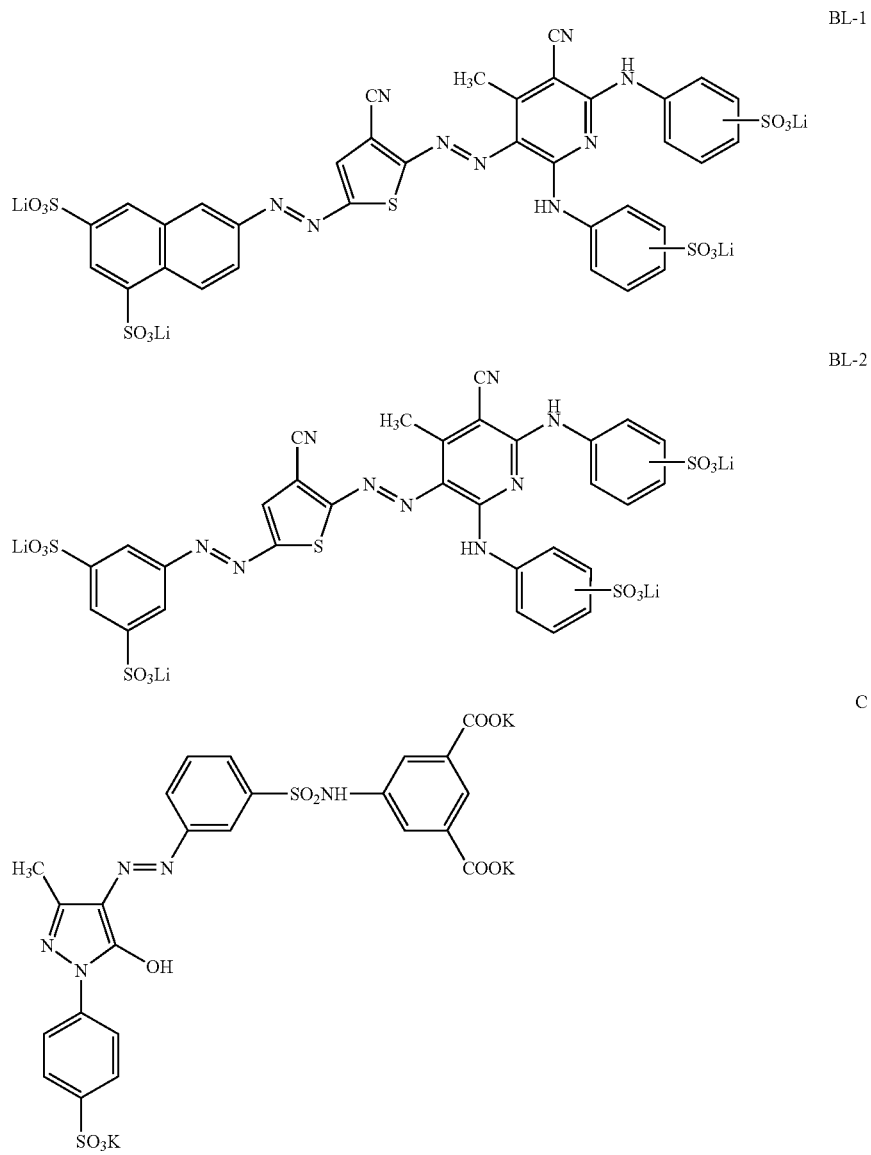

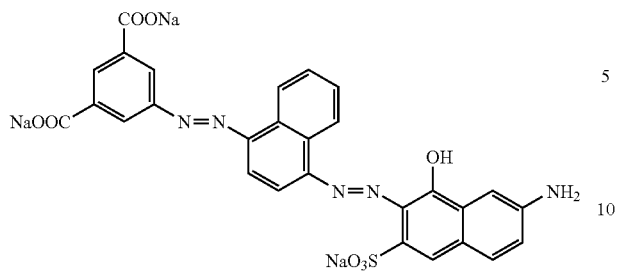

It has been noted from the results of the foregoing table that the systems using the inks of the invention are superior in all of the performances to those for comparison.

According to the invention, it is possible to provide an inkjet dark yellow ink capable of giving an image having excellent image preservability even when exposed to high-concentration ozone.

This application is based on Japanese Patent application JP 2002-333603, filed Nov. 18, 2002, and Japanese Patent application JP 2003-386207, filed Nov. 17, 2003, the entire contents of those are hereby incorporated by reference, the same as if set forth at length.

What is claimed is:

1. An inkjet color ink comprising:
   an aqueous medium;
   at least one yellow dye having a λmax of from 390 nm to 470 nm and an [I(λmax+70 nm)/I(λmax)] ratio of an absorbance I(λmax+70 nm) at λmax+70 nm to an absorbance I(λmax) at λmax of not more than 0.4; and
   at least one dye having a λmax of longer than 470 nm and not longer than 750 nm,
   the at least one yellow dye and the at least one dye being at least dissolved or dispersed in the aqueous medium, wherein
   in case the ink is printed on a reflection medium so as to form a stepwise density,
   when a light having a wavelength of a λmax of the ink in a yellow region of 390 nm to 470 nm is illuminated to the printed medium, whose reflection spectrum of the light is measured by a spectrophotometer, and a point giving a reflection spectrum such that a reflection density, $D_B$, at the λmax of the ink in the yellow region, is from 0.90 to 1.10 is selected,
   a reflection density at a λmax of the ink in a region of longer than 470 nm and not longer than 750 nm at the point is defined as $D_X$, and
   the printed medium is discolored by force using an ozone discoloration tester capable of always generating 5 ppm of ozone, a forced discoloration rate constant determined from a time when each of the reflection densities $D_B$ and $D_X$ becomes 80% of an initial density is defined, and both of the rate constants are not more than $5.0 \times 10^{-2}$ hour$^{-1}$.

2. The inkjet color ink according to claim 1, wherein the [I(λmax+70 nm)/I(λmax)] ratio is not more than 0.2.

3. The inkjet color ink according to claim 1, wherein the yellow dye and the dye having a λmax of longer than 470 nm and not longer than 750 nm have an oxidation potential nobler than 1.0 V (vs SCE).

4. The inkjet color ink according to claim 2, wherein the yellow dye and the dye having a λmax of longer than 470 nm and not longer than 750 nm have an oxidation potential nobler than 1.0 V (vs SCE).

5. The inkjet color ink according to claim 1, wherein the yellow dye is a compound represented by the following formula (1):

(1)

wherein $A_{11}$ and $B_{11}$ each independently represents an optionally substituted heterocyclic group.

6. The inkjet color ink according to claim 2, wherein the yellow dye is a compound represented by the following formula (1):

(1)

wherein $A_{11}$ and $B_{11}$ each independently represents an optionally substituted heterocyclic group.

7. The inkjet color ink according to claim 1, wherein at least one dye having a λmax of longer than 470 nm and not longer than 750 nm is a compound represented by the following formula (2):

(2)

wherein $A_{21}$, $B_{21}$, and $C_{21}$ each independently represents an optionally substituted aromatic group or heterocyclic group; and m and n each represents an integer of 0 or more.

8. The inkjet color ink according to claim 2, wherein at least one dye having a λmax of longer than 470 nm and not longer than 750 nm is a compound represented by the following formula (2):

(2)

wherein $A_{21}$, $B_{21}$, and $C_{21}$ each independently represents an optionally substituted aromatic group or heterocyclic group; and m and n each represents an integer of 0 or more.

9. The inkjet color ink according to claim 5, wherein the compound represented by formula (1) is a compound represented by one of the following formulas (12), (13), and (14):

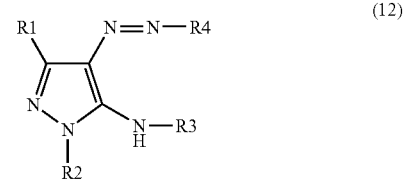

(12)

wherein R1 and R3 each independently represents a hydrogen atom, a cyano group, an alkyl group, a cycloalkyl group, an aralkyl group, an alkoxy group, an alkylthio group, an arylthio group, an aryl group, or an ionically hydrophilic group, R2 represents a hydrogen atom, an alkyl group, a cycloalkyl group, an aralkyl group, a carbamoyl group, an acyl group, an aryl group, or a heterocyclic group, and R4 represents a heterocyclic group;

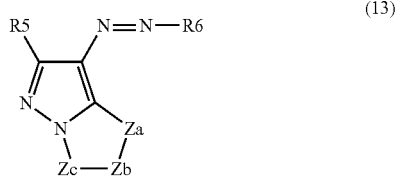

(13)

wherein R5 represents a hydrogen atom, a cyano group, an alkyl group, a cycloalkyl group, an aralkyl group, an alkoxy group, an alkylthio group, an arylthio group, an aryl group, or an ionically hydrophilic group; Za represents —N=, —NH—, or —C(R11)—; Zb and Zc each independently represents —N= or —C(R11)=; R11 represents a hydrogen atom or a non-metallic substituent; and R6 represents a heterocyclic group; and

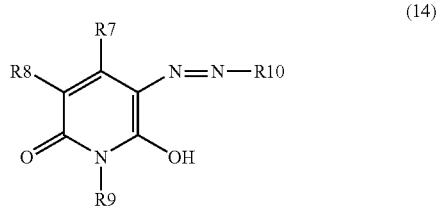

(14)

wherein R7 and R9 each independently represents a hydrogen atom, a cyano group, an alkyl group, a cycloalkyl group, an aralkyl group, an aryl group, an alkylthio group, an arylthio group, an alkoxycarbonyl group, a carbamoyl group, or an ionically hydrophilic group; R8 represents a hydrogen atom, a halogen atom, an alkyl group, an alkoxy group, an aryl group, an aryloxy group, a cyano group, an acylamino group, a sulfonylamino group, an alkoxycarbonylamino group, a ureido group, an alkylthio group, an arylthio group, an alkoxycarbonyl group, a carbamoyl group, a sulfamoyl group, a sulfonyl group, an acyl group, an alkylamino group, an arylamino group, a hydroxyl group, or an ionically hydrophilic group; and R10 represents a heterocyclic group.

10. The inkjet color ink according to claim 7, wherein the compound represented by formula (2) is a compound represented by the following formula (2-1):

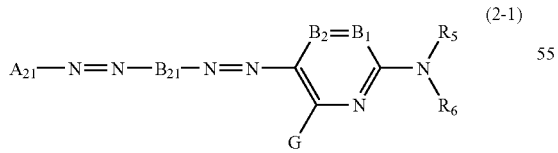

(2-1)

wherein $B_1$ and $B_2$ each independently represents =CR$_1$— or —CR$_2$=, or one of them represents a nitrogen atom, and the other represents =CR$_1$— or —CR$_2$=, G, $R_1$, and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, or a sulfo group, and $R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group.

11. The inkjet color ink according to claim 10, wherein the compound represented by formula (2-1) is a compound represented by the following formula (2-2):

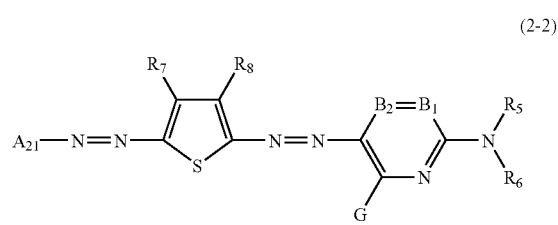

(2-2)

wherein $R_7$ and $R_8$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, or a sulfo group.

12. The inkjet color ink according to claim 10, wherein the compound represented by formula (2-1) is a compound represented by the following formula (2-4):

(2-4)

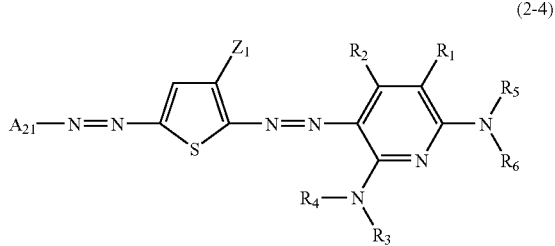

wherein $Z_1$ represents an electron withdrawing group having a Hammett's substituent constant σp value of 0.20 or more, and $R_3$ and $R_4$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group.

13. The inkjet color ink according to claim 7, wherein m in formula (2) is 1 or 2.

14. The inkjet color ink according to claim 7, wherein n in formula (2) is 1 or 2.

15. The inkjet color ink according to claim 7, wherein each of m and n in formula (2) is 1.

16. The inkjet color ink according to claim 7, wherein at least two of $A_{21}$, $B_{21}$, and $C_{21}$ in formula (2) each represents an optionally substituted, unsaturated heterocyclic group.

17. The inkjet color ink according to claim 7, wherein at least $B_{21}$ and $C_{21}$ in formula (2) each represents an unsaturated heterocyclic group.

18. The inkjet color ink according to claim 10, wherein the amino group is selected from the group consisting of an alkylamino group, an arylamino group and a heterocyclic amino group.

19. The inkjet color ink according to claim 11, wherein the amino group is selected from the group consisting of an alkylamino group, an arylamino group and a heterocyclic amino group.

* * * * *